(12) United States Patent
Hudson, III

(10) Patent No.: US 8,271,943 B2
(45) Date of Patent: Sep. 18, 2012

(54) AUTOMATICALLY GENERATING A GRAPHICAL PROGRAM WITH A PLURALITY OF MODELS OF COMPUTATION

(75) Inventor: Duncan G. Hudson, III, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1540 days.

(21) Appl. No.: 11/739,373

(22) Filed: Apr. 24, 2007

(65) Prior Publication Data

US 2008/0270920 A1 Oct. 30, 2008

(51) Int. Cl.
*G06F 9/45* (2006.01)
(52) U.S. Cl. ..................................... 717/113
(58) Field of Classification Search .................. 717/113
See application file for complete search history.

(56) References Cited

U.S. PATENT DOCUMENTS

| | | | |
|---|---|---|---|
| 4,796,179 A | 1/1989 | Lehman et al. | |
| 4,831,580 A | 5/1989 | Yamada | |
| 4,860,204 A | 8/1989 | Gendron et al. | |
| 4,901,221 A | 2/1990 | Kodosky et al. | |
| 5,210,837 A | 5/1993 | Wiecek | |
| 5,301,336 A * | 4/1994 | Kodosky et al. | 715/846 |
| 5,481,712 A | 1/1996 | Silver et al. | |
| 5,481,741 A | 1/1996 | McKaskle et al. | |
| 5,576,946 A | 11/1996 | Bender et al. | |
| 5,612,866 A | 3/1997 | Savanyo et al. | |
| 5,732,277 A | 3/1998 | Kodosky et al. | |
| 5,742,504 A | 4/1998 | Meyer et al. | |
| 5,862,372 A | 1/1999 | Morris et al. | |
| 5,911,070 A | 6/1999 | Solton et al. | |
| 5,940,296 A | 8/1999 | Meyer | |
| 5,966,532 A | 10/1999 | McDonald et al. | |
| 6,044,211 A | 3/2000 | Jain | |
| 6,053,951 A | 4/2000 | McDonald et al. | |
| 6,219,628 B1 | 4/2001 | Kodosky et al. | |
| 6,272,672 B1 | 8/2001 | Conway | |
| 6,366,300 B1 | 4/2002 | Ohara | |
| 6,437,805 B1 | 8/2002 | Sojoodi et al. | |
| 6,453,464 B1 | 9/2002 | Sullivan et al. | |

(Continued)

FOREIGN PATENT DOCUMENTS

EP 1077404 C1 2/2001

OTHER PUBLICATIONS

"Signal Processing Work System, Hardware Design System User's Guide"; May 1996; 10 pages; Alta Group of Cadence Design Systems, Inc.

(Continued)

*Primary Examiner* — John Chavis
(74) *Attorney, Agent, or Firm* — Meyertons Hood Kivlin Kowert & Goetzel, P.C.; Jeffrey C. Hood; Joel L. Stevens

(57) ABSTRACT

A system and method for automatically generating a graphical program or a portion of a graphical program in response to receiving user input. The user input may specify functionality of the graphical program or graphical program portion to be generated. In response to the user input, a graphical program (or graphical program portion) that implements the specified functionality may be automatically generated. The graphical program may include a plurality of computational models. Thus, different graphical programs may be generated, depending on the user input received.

24 Claims, 10 Drawing Sheets

U.S. PATENT DOCUMENTS

| | | |
|---|---|---|
| 6,865,429 B1 | 3/2005 | Schneider et al. |
| 6,880,130 B2 | 4/2005 | Makowski et al. |
| 7,000,190 B2 | 2/2006 | Kudukoli et al. |
| 7,043,693 B2 | 5/2006 | Wenzel et al. |
| 7,076,740 B2 | 7/2006 | Santori et al. |
| 7,120,876 B2 | 10/2006 | Washington et al. |
| 7,159,183 B1 | 1/2007 | Kudukoli et al. |
| 7,200,838 B2 | 4/2007 | Kodosky et al. |
| 7,210,117 B2 | 4/2007 | Kudukoli et al. |
| 7,480,906 B2 * | 1/2009 | Joffrain et al. ............... 717/171 |
| 7,496,985 B1 | 3/2009 | Morad |
| 7,797,673 B2 * | 9/2010 | Szpak .......................... 717/105 |
| 2001/0020291 A1 * | 9/2001 | Kudukoli et al. .................. 717/1 |
| 2001/0052110 A1 | 12/2001 | Orbanes et al. |
| 2002/0083413 A1 * | 6/2002 | Kodosky et al. .............. 717/109 |
| 2002/0129333 A1 | 9/2002 | Chandhoke et al. |
| 2003/0046663 A1 | 3/2003 | Rogers et al. |
| 2003/0071842 A1 | 4/2003 | King et al. |
| 2003/0071845 A1 | 4/2003 | King et al. |
| 2004/0034696 A1 | 2/2004 | Joffrain et al. |
| 2004/0034847 A1 | 2/2004 | Joffrain et al. |
| 2004/0107414 A1 | 6/2004 | Bronicki et al. |
| 2004/0158812 A1 | 8/2004 | Dye et al. |
| 2004/0230946 A1 | 11/2004 | Makowski et al. |
| 2005/0028138 A1 | 2/2005 | Case et al. |
| 2005/0091602 A1 | 4/2005 | Ramamoorthy et al. |
| 2005/0177816 A1 | 8/2005 | Kudukoli et al. |
| 2005/0251789 A1 | 11/2005 | Peck et al. |
| 2005/0257194 A1 | 11/2005 | Morrow et al. |
| 2005/0257195 A1 | 11/2005 | Morrow et al. |
| 2006/0225034 A1 | 10/2006 | Peck et al. |
| 2007/0203683 A1 | 8/2007 | Kornerup et al. |

OTHER PUBLICATIONS

"Signal Processing Work System, Designer/BDE User's Guide"; Feb. 1996; 2 pages; Alta Group of Cadence Design Systems, Inc.

"Signal Processing Work System, HDS Library Reference"; May 1996; 6 pages; Alta Group of Cadence Design Systems, Inc.

U.S. Appl. No. 12/487,003, entitled "Providing Target Specific Information for Textual Code at Edit Time", by Duncan G. Hudson III and Rishi H. Gosalia, filed on Jun. 18, 2009.

Edwards, "The Specification and Execution of Heterogeneous Synchronous Reactive Systems", Doctoral Dissertation, University of California, Berkeley, 1997, 170 pages.

Pino, et al., "Cosimulating Synchronous DSP Designs with Analog RF Circuits," Hewlett Packard, 1999, 15 pages.

Altium Limited, "Altium Nexar release heads 'LiveDesign-enabled'2004 product line-up", Press Release, Feb. 17, 2004, 3 pages.

Axys Design Automation, Inc., "Product Description for MaxCore", 2002, 2 pages.

Axys Design Automation, Inc., "Product Description for MaxSim", 2002, 2 pages.

International search report and written opinion, application No. PCT/US2005/016630, mailed Feb. 21, 2006.

Chang, et al., "Heterogeneous Simulation—Mixing Discrete-Event Models with Dataflow", Journal of VLSI Signal Processing, The Netherlands, 1997, pp. 127-144.

Buck, et al., "Ptolemy: A Framework for Simulating and Prototyping Heterogeneous Systems", International Journal in Computer Simulation, vol. 4, No. 2, 1994, pp. 155-182.

Besnard, et al, "Design of a multi-formalism application and distribution in a data-flow context: an example", 12th International Symposium on Languages for International Programming, Athens, Greece, Jun. 1999, pp. 8-30.

Andrade, et al., "Software Synthesis from Dataflow Models for G and LabVIEW", IEEE Asilomar Conference on Signals, Systems, and Computers, Pacific Grove, California, Nov. 1998, pp. 1705-1709.

National Instruments, "The Measurement and Automation Catalog 2004", National Instruments, 2004, 3 pages.

The Mathworks, "Stateflow for State Diagram Modeling User's Guide", Version 4, 1997, 6 pages.

The Mathworks, "Simulink Model-Based and System-Based Design", Version 5, Jul. 2002, 598 pages.

Simulink, "Simulink Release Notes", Jun. 2, 2004, 78 pages.

Chandrachoodan, et al., "An Efficient Timing Model for Hardware Implementation of Multirate Dataflow Graphs", IEEE, 2001, pp. 1153-1156.

"Optilab: Image Processing and Analysis Software for the Apple Macintosh II User's Manual", GTFS Inc., 1990, 238 pages.

Rizzo, "Image Analyst and Enhance", MacUser, Jul. 1990, pp. 55-58.

Rosenthal, et al., "Integrated Approach to Machine Vision Application Development", SPIE vol. 1386, Nov. 8, 1990, pp. 158-162.

Villiger, et al., "Self-timed Ring for Globally-Asynchronous Locally-Synchronous Systems", Proceedings of the 9th International Symposium on Asynchronous Circuits and Systems, 2003, IEEE, pp. 1-10.

Automatix,"Vision for Process Feedback and Control", News Release, www.applefritter.com/macclones/automatix/newsrelease, Jul. 3, 2000, 4 pages.

"GUI Definition", www.whatis.com, http://searchvb.techtarget.com/sDefinition/0,290660,sid8_gci213989,00.html, retrieved May 14, 2007, 1 page.

Mort, et al., "Low Cost Image Analysis Workstation Which is Menu Driven and Extensible", SPIE, vol. 1232, Feb. 4, 1990, pp. 380-389.

Signal Analytics, "IPLab User's Guide", 1991, 268 pages.

Gitlow, "X-Ray Vision", MacGuide Magazine, vol. 2, Issue 4, Jun. 1989, pp. 89-94.

Ford,, "Optimage Processes Scientific Images", 1994, 1 page.

Signal Analytics Corp., "Signal Analytics Brings Powerful Scientific Image Processing to the Macintosh II", News Release, Feb. 1, 1990, 2 pages.

Signal Analytics Corp., "IPLab: Serious Scientific Image Processing for the Macintosh II", 1992, 4 pages.

Signal Analytics Corp., "IPLab Gives You Unparalleled Value", 1992, 6 pages.

Signal Analytics Corp., "IPLab Brings Affordable Scientific Image Processing to the Macintosh II", estimated 1990, 2 pages.

Automatix, Inc., "A Seminar on Machine Vision & Image Analysis", 1993, 46 pages.

National Instruments, "Measurement and Automation Catalogue 1999", pp. 518-520.

"Ultimage and IPLab Spectrum", MacUser, Jul. 1991, 5 pages.

Magnusson, "State diagram generation", Term paper in the graduate course Attribute Grammars, Lund University, Spring 1999, 21 pages.

Vasilache, et al., "Translating OMT State Diagrams with Concurrency into SDL Diagrams", University of Tsukuba, Japan, Aug. 28-31, 2000, 7 pages.

"Graphical User Interface (GUI)", The Motive Web Design Glossary, www.motive.co.nz/glossary/gui.php, retrieved May 14, 2007, 2 pages.

National Instruments, "IMAQ Vision Builder Tutorial", Jan. 1999, 73 pages.

"Special Report: Imaging and the Macintosh/Robust Image Databases" Advanced Imaging, Apr. 1991, pp. 18-32.

Bhattacharyya, et al., "Synthesis of Embedded Software from Synchronous Dataflow Specifications", Journal of VLSI Signal Processing, vol. 21, 1999, pp. 151-166.

Hunt, "IDF: A graphical dataflow programming language for image processing and computer vision", IEEE, 1990, retrieved from the IEEE database Jan. 7, 2003, pp. 351-360.

Keddy, et al., "DEDIP: A User-friendly environment for digital image processing algorithm development", IEEE, 1991, retrieved from the IEEE database on Jan. 1, 2003, pp. 733-736.

Konstantinides, et al., "The Khoros Software Development Environment for Image and Signal Processing", 1992, retrieved from http://www.hpl.hp.com/techreports/92/HPL-92-96.pdf on Jan. 7, 2003, pp. 1-14.

Sim, et al., "Design and Implementation of the Visual Programming Environment for the Distributed Image Processing", IEEE, 1996, retrieved from IEEE database on Jan. 7, 2003, pp. 149-152.

"SILMA Products—Production PILOT", retrieved from Internet on May 24, 2001, www.adept.com/Silma/products/pd-productionpilot.html, 4 pages.

"RoboWorks", Newtonium, retrieved from Internet on Mar. 30, 2002, www.newtonium.com/public_html/Products/RoboWorks/RoboWorks.htm, 3 pages.

National Instruments, "The Measurement and Automation Catalog 2002", 19 pages.

Compumotor, "Motion Architect User Guide", Aug. 1994, 24 pages.

Ge Fanuc, "GE Fanuc Automation—Software Solutions", 2002, 8 pages.

GE Industrial Systems, "CIMPLICITY Machine Edition—Motion Developer", Dec. 6, 2001, 4 pages.

GE Fanuc, "GE Fanuc Automation—CIMPLICITY Machine Edition", 2000, 4 pages.

* cited by examiner

```
┌─────────────────────────────────────────┐
│ Developer creates a graphical program   │
│ generation (GPG) program, wherein the   │
│ GPG program is operable to generate a   │
│ plurality of graphical programs, based  │
│ on received information                 │
│                  200                    │
└─────────────────────────────────────────┘

┌─────────────────────────────────────────┐
│ Specify program information, e.g., in   │
│ response to user input, wherein the     │
│ program information specifies desired   │
│ functionality to be implemented         │
│ in a graphical program                  │
│                  204                    │
└─────────────────────────────────────────┘
                    │
                    ▼
┌─────────────────────────────────────────┐
│   Execute graphical program             │
│   generation (GPG) program              │
│                  206                    │
└─────────────────────────────────────────┘
                    │
                    ▼
┌─────────────────────────────────────────┐
│ GPG program receives information        │
│ specifying functionality for a graphical│
│ program (or graphical program portion)  │
│                  208                    │
└─────────────────────────────────────────┘
                    │
                    ▼
┌─────────────────────────────────────────┐
│ GPG program automatically generates a   │
│ graphical program (or graphical program │
│ portion) to implement the specified     │
│ functionality                           │
│                  210                    │
└─────────────────────────────────────────┘
                    │
                    ▼
┌─────────────────────────────────────────┐
│   execute the generated graphical       │
│   program                               │
│                  212                    │
└─────────────────────────────────────────┘
```

*FIG. 4*

AUTOMATICALLY GENERATING A GRAPHICAL PROGRAM WITH A PLURALITY OF MODELS OF COMPUTATION

FIELD OF THE INVENTION

The present invention relates to the field of graphical programming, and more particularly to a system and method for automatically generating a graphical program with a plurality of models of computation in response to user input specifying desired functionality of the graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW™ product have become very popular. Tools such as LabVIEW™ have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

As graphical programming environments have matured and grown in popularity and complexity, it has become increasingly desirable to provide high-level tools which help a user create a graphical program. Recently, some products allow users to automatically generate a graphical program in response to user input specifying functionality of the graphical program. However, this automatic generation of graphical programs is limited to one model of computation, e.g., dataflow graphical programming. In many instances, a program may be more intelligently represented by a plurality of models of computation. Thus, automatic generation of graphical programs (or portions thereof) which include a plurality of computational models is desirable.

SUMMARY OF THE INVENTION

One embodiment of the present invention comprises a system and method for automatically generating a graphical program, or a portion of a graphical program, which is specified in a plurality of computational models. The graphical program may be automatically generated in response to user input. The plurality of computational models are presented to the user on a display and are used to provide a more intuitive representation of the program.

The user input may specify functionality of the graphical program or graphical program portion to be generated. The user input may comprise any type of information that specifies functionality of or aspects of the graphical program desired to be created. Additionally, the user input may specify different functionality for different portions of the graphical program that is to be automatically generated. For example, the user may specify first functionality for a first portion of the graphical program (e.g., corresponding to a first computational model) and second functionality for a second portion of the graphical program (e.g., corresponding to a second computational model). The method may display a first GUI for specifying functionality for the first portion and a second GUI for specifying functionality of the second portion.

A graphical program generation program, referred to herein as a "GPG program", may be executed, wherein the GPG program may be operable to receive the user input. In other words, the GPG program, for example, may include a plurality of GUIs for specifying portions of the graphical program, e.g., corresponding to various computational models. Alternatively, the GPG program may allow the user to select a single computational model and specify functionality for that computational model.

In response to the user input, the method (e.g., the GPG program) may automatically generate a graphical program (or graphical program portion) that implements the specified functionality. Additionally, the generated graphical program may include (may be specified in) a plurality of computational models, e.g., two or more of graphical data flow, synchronous data flow, state diagram, control flow diagram, text-based code, execution flow, and/or simulation diagram, among others. The GPG program may automatically determine which computational models to use (e.g., by analyzing the user input) or may use computational models specified by the user. Thus, the GPG program may generate different graphical programs with different computational models, depending on the user input received. Alternatively, or additionally, the GPG program may generate a graphical program with a specified computational model or with two or more specified computational models.

Note that the graphical program (e.g., with a plurality of computational models) may be limited to a single window or a single document (e.g., within, for example, a graphical programming development environment such as LabVIEW™). The computational models may therefore be restricted to within a single graphical program. Thus, the plurality of computational models of the graphical program may be displayed within a single window or document after automatic generation.

In automatically generating a graphical program, the method (e.g., the GPG program) may automatically generate a block diagram portion comprising a plurality of connected icons or nodes, wherein the connected icons or nodes may visually or graphically indicate the functionality of the graphical program. In the present application, the term "automatically generating" comprises automatically generating the graphical program without user input specifying the nodes or connections between the nodes. Thus the user is not required to select and place nodes in the diagram, or draw connections (lines or wires) between the nodes. Thus the automatic generation is contrasted with manual creation of a graphical program, which requires that the user manually select nodes and establish connections between the nodes to create the graphical program.

The GPG program may generate underlying (non-visible) graphical code which implements the plurality of computational models that are displayed to the user. Thus, in some embodiments, the plurality of computational models are displayed to provide an intuitive and natural representation of the program to the user, while the automatically generated graphical program having the plurality of visible computational models may be actually specified in a single underlying (non-visible) graphical programming language. As one example, the method may automatically generate a LabVIEW graphical program having a first portion of graphical code according to a first model of computation (data flow), where the LabVIEW graphical program has a simulation window structure containing a second portion of graphical code represented in a second different model of computation (e.g., continuous time simulation data flow), wherein the second portion of graphical code is actually specified "under the hood" (invisibly to the user) with the first model of computation. As another example, the method may automatically generate a LabVIEW graphical program having graphical code according to a first model of computation (data flow), where the LabVIEW graphical program has a window structure containing text-based code (e.g., MathScript or MATLAB code). The text-based code may be implemented in (or converted to) graphical code invisibly (or visibly) to the user.

The GPG program may also automatically generate a user interface panel or front panel which may be used to provide input to and/or display output from the graphical program. In automatically generating a user interface panel, the method may automatically create various input controls and output indicators that correspond to inputs/outputs to/from the diagram, e.g., including controls and indicators that correspond to parameters of blocks in the automatically generated graphical program.

The GPG program that generates the graphical program may be constructed using any of various programming languages, methodologies, or techniques. For example, the GPG program may itself be a graphical program, or the GPG program may be a text-based program, or the GPG program may be constructed using a combination of graphical and text-based programming environments.

Also, the GPG program may have any of various purposes or applications. In one embodiment, the GPG program may include or be associated with a program or application that directly aids the user in creating a graphical program. For example, the GPG program may be included in a graphical programming development environment application. In this case, the graphical programming development environment application may be operable to receive user input specifying desired functionality and the GPG program may automatically, i.e., automatically, add a portion of graphical program code implementing the specified functionality to the user's program. The user input may be received, for example, via one or more "wizard" graphical user interface (GUI) input panels or dialogs enabling the user to specify various options. Such graphical program code generation wizards may greatly simplify the user's task of implementing various operations. As an example, it is often difficult for developers of instrumentation applications to properly implement code to analyze an acquired signal, due to the inherent complexity involved. By enabling the developer to easily specify the desired functionality through a high-level user interface, the GPG program can receive this information and automatically create graphical code to implement the signal analysis. Furthermore, since the graphical code is generated automatically, the code may be optimized, resulting in an efficient program and a readable block diagram without unnecessary code.

In various embodiments, an association between a generated graphical program and the received user input used in generating the graphical program may be maintained. For example, this association may enable the user to return from the automatically generated graphical program (or portion) to the GUI input panel(s) originally used to specify the user input, e.g., in order to modify the automatically generated graphical program (or portion). In one embodiment, a generated graphical program may be "locked", requiring the user to explicitly unlock the graphical program before the graphical program can be modified.

In various embodiments, the GPG program may be operable to generate any of various types of graphical programs. For example, as discussed above, a generated graphical program may be targeted toward a particular graphical programming development environment application. The GPG program may thus utilize proprietary features or create files that are formatted in a manner expected by the graphical programming development environment. This may be desirable or necessary when the graphical programming development environment includes a runtime environment that is required for the created graphical program to execute. Examples of graphical programming development environments include LabVIEW™, BridgeVIEW™, DasyLab™, and DiaDem™ from National Instruments, VEE™ from Hewlett Packard, Simulink™ from The MathWorks, Softwire™ from Measurement Computing, Inc., Sanscript™ from Northwoods Software, WiT™ from Coreco, and Vision Program Manager™ from PPT Vision, among others.

In various embodiments, the graphical program may be automatically generated using any of various methods or techniques. Generating the graphical program may include generating one or more files or data structures defining the graphical program. When a user interactively develops a graphical program from within a graphical programming environment, the graphical programming environment may create one or more program files. For example, the program files may specify information such as a set of nodes contained in the graphical program, interconnections among these nodes, structures such as looping and conditional branching, models of computation, etc. In other cases, the program files may store various data structures, e.g., in binary form, which the graphical programming environment uses to directly represent the graphical program. Thus, in automatically generating the graphical program, the GPG program may automatically generate one or more files or data structures representing the graphical program, wherein these files may be structured or formatted appropriately for a particular graphical programming environment. Additionally, the GPG program may automatically generate different portions of the graphical program which correspond to each of the computational models included in the graphical program. Thus, the generated graphical program may include a plurality of portions each corresponding to a plurality of computational models.

In one embodiment, a graphical programming development environment may provide an application programming interface (API) which the GPG program can use to automatically generate the graphical program. For example, for each node, user interface element, or other object of the graphical program, the API may be called to automatically add the object to the graphical program, connect the object to other objects of the graphical program, etc. Thus, any necessary files or other constructs needed by the graphical programming environment in order to use the generated graphical program may be automatically created as a result of calling the API.

BRIEF DESCRIPTION OF THE DRAWINGS

A better understanding of the present invention can be obtained when the following detailed description of the preferred embodiment is considered in conjunction with the following drawings, in which:

FIG. 4 is a flowchart diagram illustrating one embodiment of a method for automatically generating a graphical program in response to receiving program information;

Figure 1:
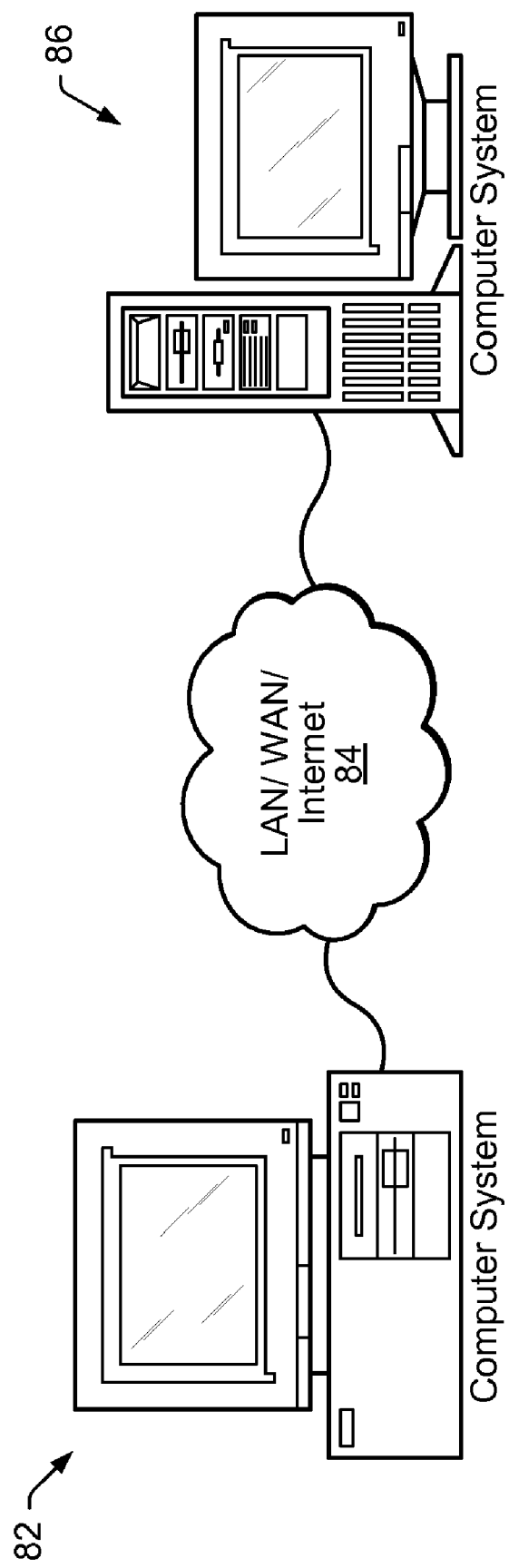
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. Pat. No. 6,437,805 titled "System and Method for Accessing Object Capabilities in a Graphical Program" filed Aug. 18, 1998.

U.S. patent application Ser. No. 10/869,656, published as U.S. Publication No. 20050257195 titled "Creating and executing a graphical program with first model of computation that includes a structure supporting second model of computation", whose inventors were Gregory O. Morrow, John C. Limroth, Jeffrey L. Kodosky, Steven W. Rogers, Kevin Hogan, and Hugo A. Andrade;

Ser. No. 09/595,003 titled "System and Method for Automatically Generating a Graphical Program to Implement a Prototype," filed Jun. 13, 2000.

U.S. patent application Ser. No. 09/745,023, published as U.S. Publication No. 2001/0020291, titled "System and Method for Programmatically Generating a Graphical Program in Response to Program Information," filed Dec. 20, 2000.

U.S. Pat. No. 6,173,438 titled "Embedded Graphical Programming System" filed on Aug. 18, 1997, whose inventors were Jeffrey L. Kodosky, Darshan Shah, Samson DeKey, and Steve Rogers.

U.S. Pat. No. 6,219,628 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

U.S. Pat. No. 7,120,876, titled "System and Method for Programmatically Generating a Graphical Program in Response to User Input" filed Jun. 20, 2001, whose inventors were Jeffrey D. Washington, Ram Kudukoli, Robert E. Dye, and Paul F. Austin.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices consisting of multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons (icons connected by lines or wires), wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEWφ, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc. The term "graphical program" is intended to include a program where at least a portion of the program is a graphical program, while other portions may have various other models of computation.

A graphical program may be displayed to the user as a plurality of interconnected nodes (nodes connected by lines). Alternatively, a graphical program may be not displayed, i.e., may not be visible to the user. Thus the term "graphical program" includes a program having a syntax that is stored as a graph (nodes and edges), rather than stored as a tree, in the memory of the computer system, wherein the stored graph could optionally be (but is not necessarily) displayed as a plurality of nodes or icons connected by lines. A graphical program, e.g., these data structures and/or program instructions, may be compiled or interpreted, or converted to another form, such as C, and then compiled, to produce machine language that accomplishes the desired method or process as shown in (or represented by) the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes (not to be confused with the nodes that connect components in a circuit diagram).

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Model of Computation (or Computational Model)—a model for visually specifying or visually representing program code to a user. A "model of computation" may also be considered as a set of program semantics of a programming language. Examples of "models of computation" include various forms of graphical data flow, such as data driven data flow (e.g., LabVIEW), demand driven data flow, synchronous data flow, state diagram, control flow diagram, simulation diagram models (continuous time simulation data flow), and/or various forms of text-based code (such as Matlab and MathScript, C, C++, etc.), among others. A program portion may be visually represented on a display in a first computational model, but may in fact be actually implemented in the computer using a different computational model that may be hidden from the user. For example, Matlab is a text-based scripting language that is implanted in the C programming language. As another example, MathScript is a text-based scripting language implemented in the LabVIEW graphical programming language. A program portion may be represented in a first model of computation to provide a more intuitive visual representation of the functionality of the program portion, e.g., to allow the user to more readily understand and/or edit the program portion.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 may include or store a computer program, referred to herein as a graphical program generation program, or a "GPG program", that is operable to receive program information and automatically generate a graphical program e.g., with a plurality of models of computation, based on the program information. One embodiment of a method for automatically generating a graphical program is described below.

In one embodiment, the GPG program may be implemented as a self-contained program or application that includes all necessary program logic for generating the graphical program. In another embodiment, the GPG program may comprise a client portion and a server portion (or client program and server program), wherein the client portion may request or direct the server portion to generate the graphical program. For example, the client portion may utilize an application programming interface (API) provided by the server portion in order to generate the graphical program. In other words, the client portion may perform calls to the API provided by the server portion, and the server portion may execute functions or routines bound to these calls to generate the graphical program. In one embodiment, the server portion may be an instance of a graphical programming development environment application. For example, the LabVIEW™ graphical programming development environment (provided by National Instruments) application enables client programs to interface with a LabVIEW server in order to automatically generate or modify graphical programs.

As used herein, the term "GPG program" is intended to include any of various implementations of a program (or programs) that are executable to automatically generate a graphical program based on received program information. For example, the term "GPG program" is intended to include an embodiment in which the GPG program is a self-contained program or application (not implemented as a client/server program) that includes all necessary program logic for automatically generating a graphical program. The term "GPG program" is also intended to include an embodiment in which a combination of a client portion (or client program) and server portion (or server program) operate together to automatically generate the graphical program. The term "GPG program" is also intended to include other program implementations.

In an embodiment in which a client program interfaces with a server program to generate the graphical program, the server program may execute on the same computer system as the client program or may execute on a different computer system, e.g., a different computer system connected via a network. For example, in FIG. 1, the client program may execute on the computer system 82, and the server program may execute on the computer system 86. In this case, the graphical program, e.g., files representing the graphical program may be created on the computer system 82, or 86, or on a different computer system.

It is noted that the GPG program may be implemented using any of various programming technologies or methodologies. Where the GPG program is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 86, and other computer systems connected to the network 84. Also, in various embodiments, the client program may interface with the server program through a proxy software component or program.

Figure 2A:
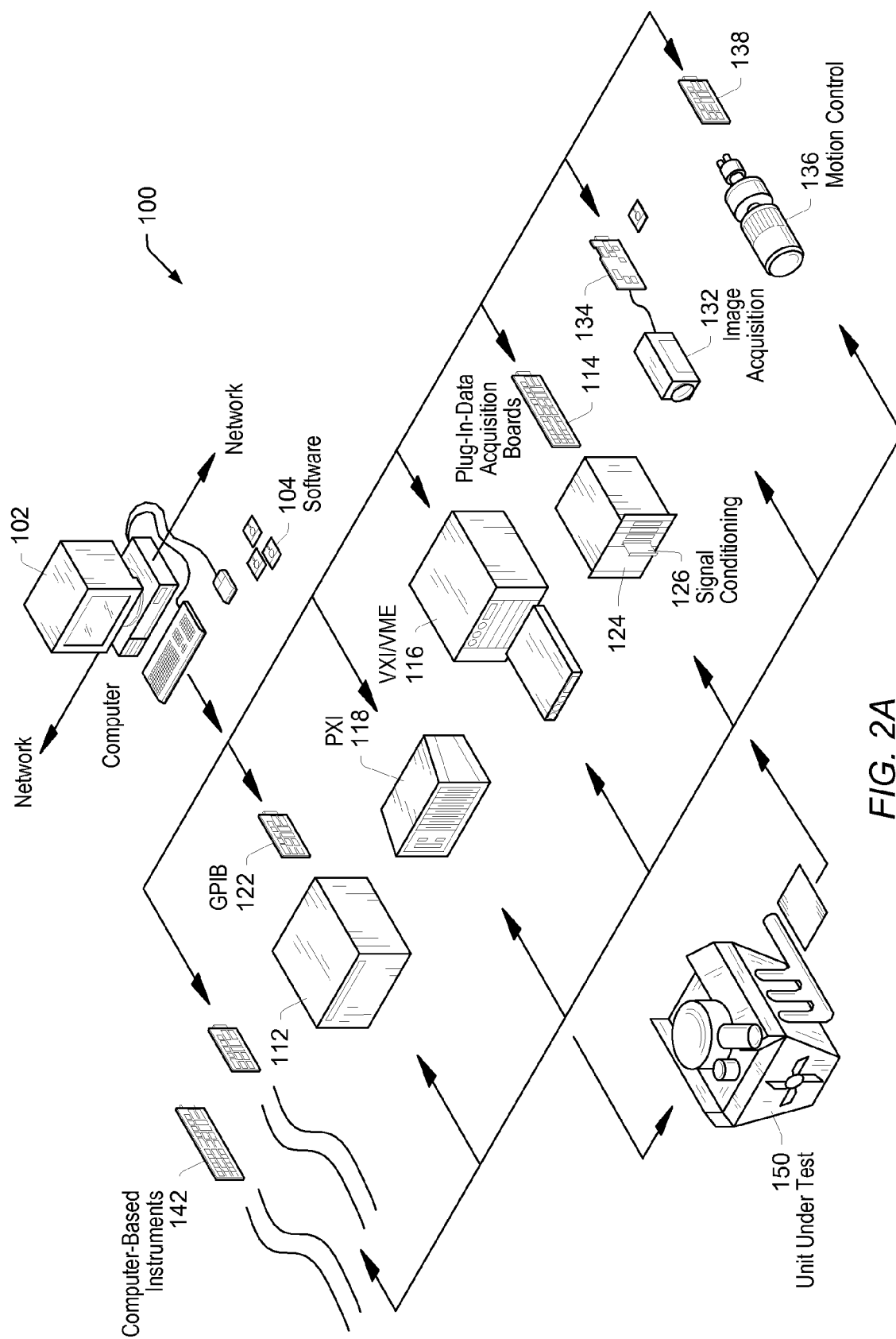
FIGS. 2A and 2B illustrate representative instrumentation and process control systems including various I/O interface options.
Figure 2B:
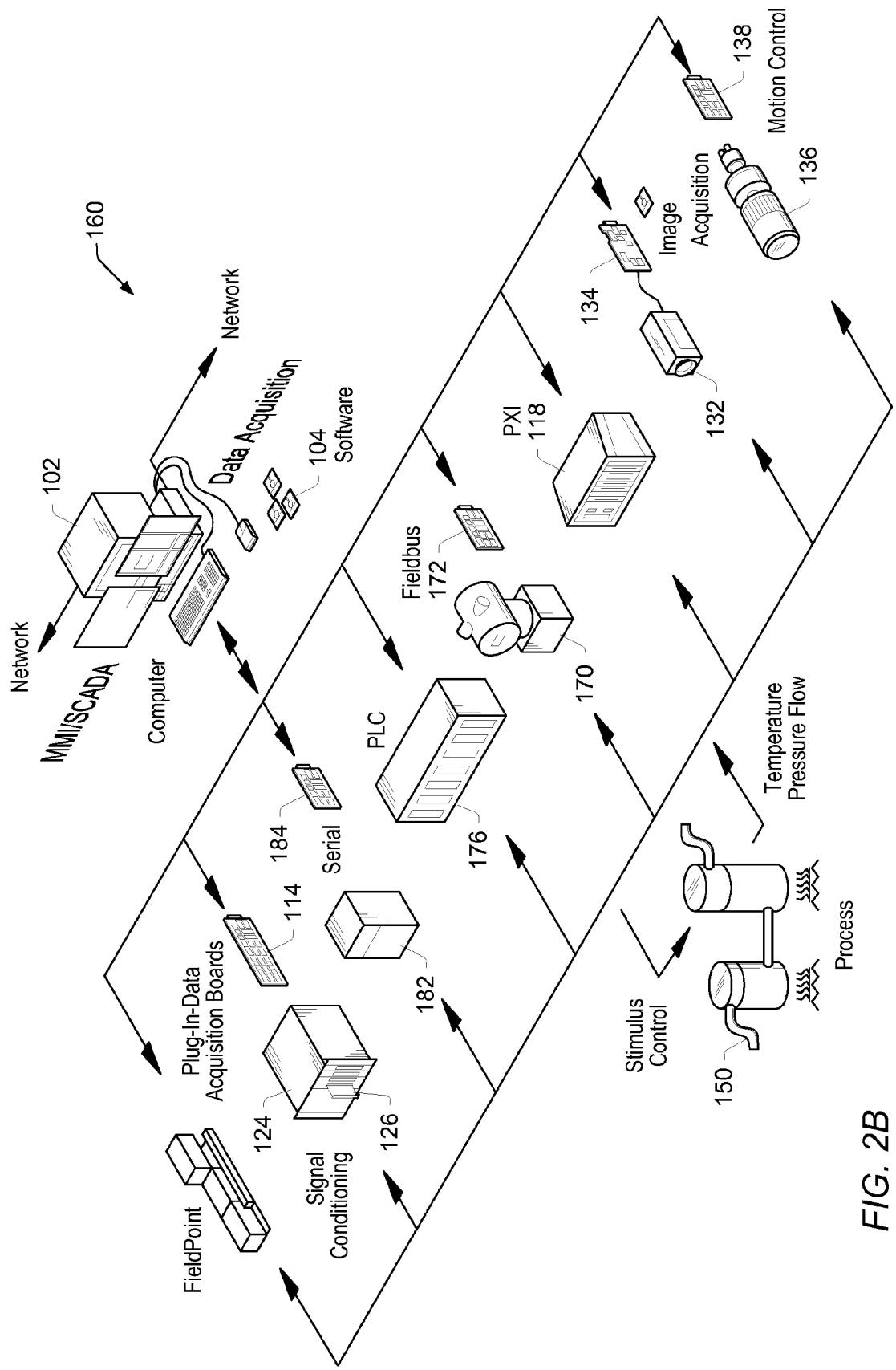

FIGS. 2A and 2B—Instrumentation and Industrial Automation Systems

FIGS. 2A and 2B illustrate exemplary systems which may store or use a GPG program and/or a server program which are operable to automatically generate a graphical program with a plurality of computational models. Also, these systems may execute an automatically generated graphical program. For example, the graphical program may perform an instrumentation function, such as a test and measurement function or an industrial automation function. It is noted that the GPG program, the server program, and/or a generated graphical program may be stored in or used by any of various other types of systems as desired and may implement any function or application as desired. Thus, FIGS. 2A and 2B are exemplary only.

FIG. 2A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may be either of the computers 82 or 86 shown in FIG. 1, which as described above are operable to automatically generate graphical programs based on received information. Also, in one embodiment, the computer 102 may execute a generated graphical program, such as a graphical program that controls or models one or more of the connected instruments.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, a man-machine interface application, or other types of applications.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may be either of the computers 82 or 86 shown in FIG. 1, which as described above are operable to automatically generate graphical programs based on received information. Also, in one embodiment, the computer 102 may execute a generated graphical program, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system(s) 102 preferably includes a memory medium(s) on which one or more computer programs or software components according to one embodiment of the present invention are stored. For example, the memory medium may store a GPG program which is executable to receive program information and automatically generate a graphical program based on the information. The same or a different memory medium may also store a server program with which a client portion of the GPG program interfaces in order to generate the graphical program. The memory medium may also store an automatically generated graphical program. The memory medium may also store a graphical programming development environment application operable execute or edit the automatically generated graphical program. It is noted that various of these software programs may be stored on different computer systems, as described above with reference to FIG. 1. Also, in various embodiments, various of the above software programs may be implemented or combined in different ways. For example, a graphical programming development environment application may implement the server program with which a client program interfaces to automatically generate a graphical program.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the GPG program and/or the resulting graphical program that is automatically generated may be designed for data acquisition/generation, analysis, and/or display, and for controlling or modeling instrumentation or industrial automation hardware. For example, in one embodiment, the National Instruments LabVIEW™ graphical programming development environment application, which provides specialized support for developers of instrumentation applications, may act as the server program. In this embodiment, the client program may be a software program that receives and processes program information and invokes functionality of the LabVIEW™ graphical programming development environment. The client program may also be a program involved with instrumentation or data acquisition.

However, it is noted that the present invention can be used for a plethora of applications and is not limited to instrumentation or industrial automation applications. In other words, FIGS. 2A and 2B are exemplary only, and graphical programs for any of various types of purposes may be generated by a GPG program designed for any of various types of purposes, wherein the programs are stored in and execute on any of various types of systems. Various examples of GPG programs and generated graphical programs are discussed below.

Figure 3:
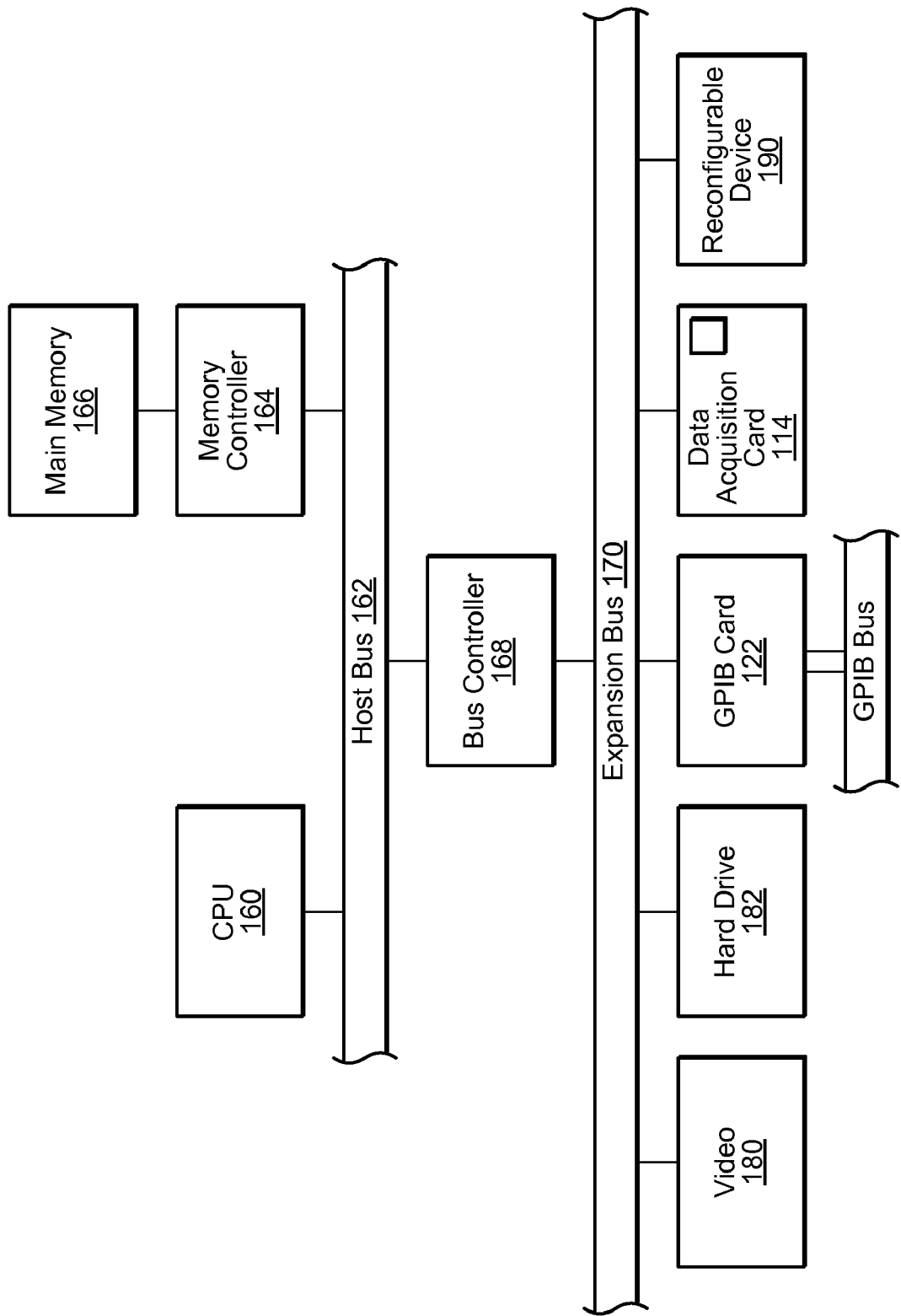
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention, such as described above with reference to FIGS. 2A and 2B. The main memory 166 may also store operating system software as well as other software for operation of the computer system, as well known to those skilled in the art. Computer programs stored in the main memory 166 may implement one or more of the methods described below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A) and a GPIB interface card 122 which provides a GPIB bus interface to the GPIB instrument 112 (of FIG. 2A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, an automatically generated graphical program may be downloaded and executed on the reconfigurable instrument 190. For example, a graphical programming development environment with which the graphical program is associated may provide support for downloading a graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 2A.

FIG. 4—Automatic Creation of a Graphical Program with Computational Models

In prior systems, a user interactively or manually creates or edits a graphical program. For example, the user may interactively add various objects or icons to a graphical program block diagram, connect the objects together, etc. In contrast, one embodiment of the present invention comprises a system and method for automatically generating a graphical program (or portion of a graphical program) without requiring this type of user interaction. As indicated above, the automatically generated graphical program may include a plurality of computational models and/or may include a specified computational model.

FIG. 4 is a flowchart diagram illustrating one embodiment of a method for automatically generating a graphical program with a plurality of computational models. Note that the method of FIG. 4 may be implemented using various systems described above, among others. Additionally, the illustrated steps may be omitted, modified, or performed in a different order than shown. Other steps may be added as desired. As shown, the method operates as follows.

In 200, a graphical program generation (GPG) program may be created, wherein the GPG program is operable to automatically generate a plurality of graphical programs, e.g., with a plurality of computational models, based on received information. As described below, the GPG program may be associated with any of various purposes or applications. Also, as discussed above, the GPG program may be implemented in various ways, e.g., using graphical and/or text-based programming environments. For example, the GPG program may be a text-based program, such as a program written using C, C++, Java, Basic, Visual Basic, FORTRAN, Pascal, or another text-based programming language. Also, the GPG program may itself be a graphical program. For example, the GPG program may be a graphical program interactively created in response to user input. In some embodiments, a "GPG program" may refer to any type of program that produces, as a part of its execution, a graphical program or portion thereof. For example, the GPG program could be a compiler, interpreter, and/or translator (among others).

As described below, the GPG program may be implemented based on a client/server programming model. The client portion may call an application programming interface (API) provided by the server portion usable for automatically creating the new graphical program. For example, a text-based GPG program may include text-based code for calling various API functions or methods, while a graphical GPG program may include various graphical nodes which are operable to invoke functions of the API. The creation of the GPG program may be performed by a developer, wherein the GPG program may then be used as a tool for the automatic creation of graphical programs by users or other developers. As noted above, the GPG program may be used to automatically generate a graphical program with a plurality of computational models and/or automatically create a graphical program with a specified computational model.

In 204, program information for the new graphical program (or graphical program portion) to be generated may be specified. In some embodiments, the program information for the new graphical program may be received from a user and/or in response to user input. For example, the user may specify functionality of the graphical program by entering information into a graphical user interface (GUI), e.g., of the GPG program. In some embodiments, the user may simply enter specifications for the graphical program to be generated in a single user input to a GUI or via a series of GUIs (or windows thereof), e.g., in a wizard. Alternatively, or additionally, the user may specify functionality for various portions of the graphical program, e.g., using a different GUI for each portion. In one embodiment, each of the portions may correspond to a different computational model. Thus, in one embodiment, the user may specify functionality for respective ones of a plurality of computational models. In other words, user input specifying functionality of the graphical program may include receiving a plurality of user inputs, e.g., to different GUIs, each specifying desired functionality of respective portions of the graphical program.

For example, in one embodiment, first user input may be received specifying first desired functionality of a first portion of the graphical program and second user input may be received specifying second desired functionality of a second portion of the graphical program. In this example, the first portion may correspond to a first computational model, and the second portion may correspond to a second computational model. The computational models may include graphical data flow, synchronous data flow, state diagram, control flow diagram, execution flow, text-based code, and/or simulation diagram, among others. In various embodiments, the user may explicitly specify computational models for the graphical program (e.g., corresponding to portions of the graphical program) or may only specify functionality of the graphical program and allow the GPG to analyze and/or determine (e.g., automatically) appropriate computational models, as desired.

In some embodiments, the user may choose one or more template graphical programs (or portions of graphical programs) and specify functionality of the graphical program (or portion thereof) for the one or more templates. In other words, the user may choose a template graphical program and provide details regarding the template for automatic creation of the desired graphical program. Thus, the specified program information may comprise any of various types of information and may specify functionality of the new graphical program.

In step 206, the GPG program may be executed. The GPG program may be executed in any type of computer system, such as those described above, among others.

In step 208, the GPG program may receive the program information specifying the functionality for the graphical program or graphical program portion. As described below, the GPG program may receive any type of information from any type of source.

In step 210, the GPG program may automatically generate a graphical program or graphical program portion to implement the functionality specified by the received information. As indicated above, the automatically generated program may include a plurality of computational models, e.g., graphical data flow, synchronous data flow, state diagram, execution flow, control flow diagram, text-based code, and/or simulation diagram computational models, among others. In other words, in response to receiving the information in 208, the GPG program may automatically generate a new graphical program or program portion a plurality of computational models based on the information, e.g., received from the user. In particular, the automatically generated graphical program may include a first portion, e.g., a data-flow portion, which includes a plurality of interconnected nodes which visually indicate functionality of the first portion of the graphical program.

Note that the graphical program (e.g., with a plurality of computational models) may be limited to a single window or a single document (e.g., within, for example, a graphical programming development environment such as Lab-VIEW®). The computational models may therefore be restricted to within a single graphical program. Thus, the plurality of computational models of the graphical program may be displayed within a single window or document after automatic generation.

Thus the term "graphical program" is intended to include a program where at least a portion of the program is a graphical program, while other portions may have various other models of computation, such as text-based code, etc. For example, in one embodiment, one of the computational models may include graphical programming computational models (described above, e.g., including graphical data flow, execution flow, etc.), while other portions of the program are represented in other (non-graphical program) computational models.

In alternate embodiments, the high level program can be represented as a graphical program, but one or more of (or all) of the nodes in the graphical program may represent subprograms that are specified in non-graphical program computational models may not include graphical programming computational models. For example, the graphical program may comprise 2 nodes connected by one wire, where each of the 2 nodes references different text-based computational models. In these cases, the two computational models may be represented as nodes in the generated graphical program which are interconnected by at least one wire that indicates a dependency, invocation, or other connection between the two portions of the graphical program. Thus, the graphical program may provide a framework to interconnect two different computational models when the plurality of computational models does not include a graphical program computational model.

In the present application, the term "automatically generating" comprises automatically generating the graphical program without user input specifying the nodes or connections between the nodes. Thus the user is not required to select and place nodes in the diagram, or draw connections (lines or wires) between the nodes. Thus, the automatic generation is contrasted with manual creation of a graphical program, which requires that the user manually select nodes and establish connections between the nodes to create the graphical program.

Following the descriptions above, the graphical program may be automatically generated with little or no user input received during this creating. In one embodiment, the graphical program is automatically generated with no user input required. In another embodiment, the user may be prompted for certain decisions during automatic generation, such as the type of graphical program, the look and feel of a user interface for the graphical program, the number or degree of comments contained within the graphical program, the types of computational models to be used, specific implementations of program portions in various ones of the computational models, confirmation of the computational models being used, etc.

In automatically generating the graphical program, the GPG program may process the information received in 208 in order to determine how to generate the graphical program. For example, the GPG program may process the information in order to determine the plurality of computational models to include in the graphical program (and possibly portions of the graphical program associated therewith), appropriate underlying graphical code for the program, an appropriate user interface for the program, etc. Thus, the GPG program may analyze and/or determine which computational models should be included in the desired graphical program using the provided information received in 204. As indicated above, the computational models may be defined explicitly by the received program information and/or implicitly by the specified functionality (among other methods). As described below, the determination of how to generate the graphical program may depend on a combination of the received information and/or the program logic of the GPG program (i.e., what the GPG program is operable to do with the received information).

In automatically generating the determined graphical program, the GPG program may specify the inclusion of various objects in the new graphical program. For example, the new graphical program may have a diagram portion including a plurality of interconnected nodes which visually indicate functionality of the new graphical program, e.g., in a first portion of the graphical program possibly corresponding to a first computational model (e.g., data flow). However, as indicated above, the new graphical program may include (or be specified in) other computational models such as those enumerated above, among others. For example, the GPG program may automatically include text-based code (e.g., in one of the plurality of computational models) of the graphical program. More specifically, in automatically generating the graphical program, the GPG program may include or select a program or script in text-based code that implements at least a portion of the desired functionality. Alternatively, or additionally, the text-based code may be automatically generated from a template or de novo. Said another way, the GPG program may automatically generate a portion of the graphical program by generating or including text-based code via a variety of methods, e.g., generation and/or selection, among others. Note that a graphical program that includes text-based code (e.g., in a window or node of the graphical program) may still be referred to as a graphical program. In some embodiments, the text-based code may be specified in one of the plurality of computational models of the graphical program.

The new graphical program may also have a user interface portion including various user interface objects, such as one or more user interface panels having controls for specifying user input to the graphical program and/or indicators for displaying output from the graphical program. The GPG program may also specify other aspects of the graphical program, such as: interconnections between diagram objects, connections between diagram objects and user interface objects, positions of objects, sizes of objects, input/output terminals or terminal names for diagram objects, comments for diagram objects, and properties or configuration of objects (e.g., configuration of data types, parameters, etc.), among other aspects of the graphical program.

In various embodiments, the GPG program may generate a graphical program of any of various types and/or with various computational models. In some embodiments, the GPG program may generate the graphical program specifically so that a particular graphical programming development environment is operable to edit and/or execute the graphical program. As discussed, the automatically generated graphical program may be specified in a plurality of computational models. However, the graphical program may include underlying graphical code that represents the graphical program. In other words, the underlying graphical code may implement the functionality of the various portions specified in the plurality of computational models.

For example, the GPG program may automatically generate underlying (non-visible) graphical code which implements the plurality of computational models that are displayed to the user. Thus, in some embodiments, the plurality of computational models are displayed to provide an intuitive and natural representation of the program to the user, while the automatically generated graphical program having the plurality of visible computational models may be actually specified in a single underlying (non-visible) graphical programming language. As one example, the method may automatically generate a LabVIEW® graphical program having a first portion of graphical code according to a first model of computation (data flow), where the LabVIEW® graphical program has a simulation window structure containing a second portion of graphical code represented in a second different model of computation (e.g., continuous time simulation data flow), wherein the second portion of graphical code is actually specified "under the hood" (invisibly to the user) with the first model of computation. As another example, the method may automatically generate a LabVIEW graphical program having graphical code according to a first model of computation (data flow), where the LabVIEW graphical program has a window structure containing text-based code (e.g., MathScript or MATLAB code). The text-based code may be implemented in (or converted to) graphical code invisibly (or visibly) to the user.

Figure 7:
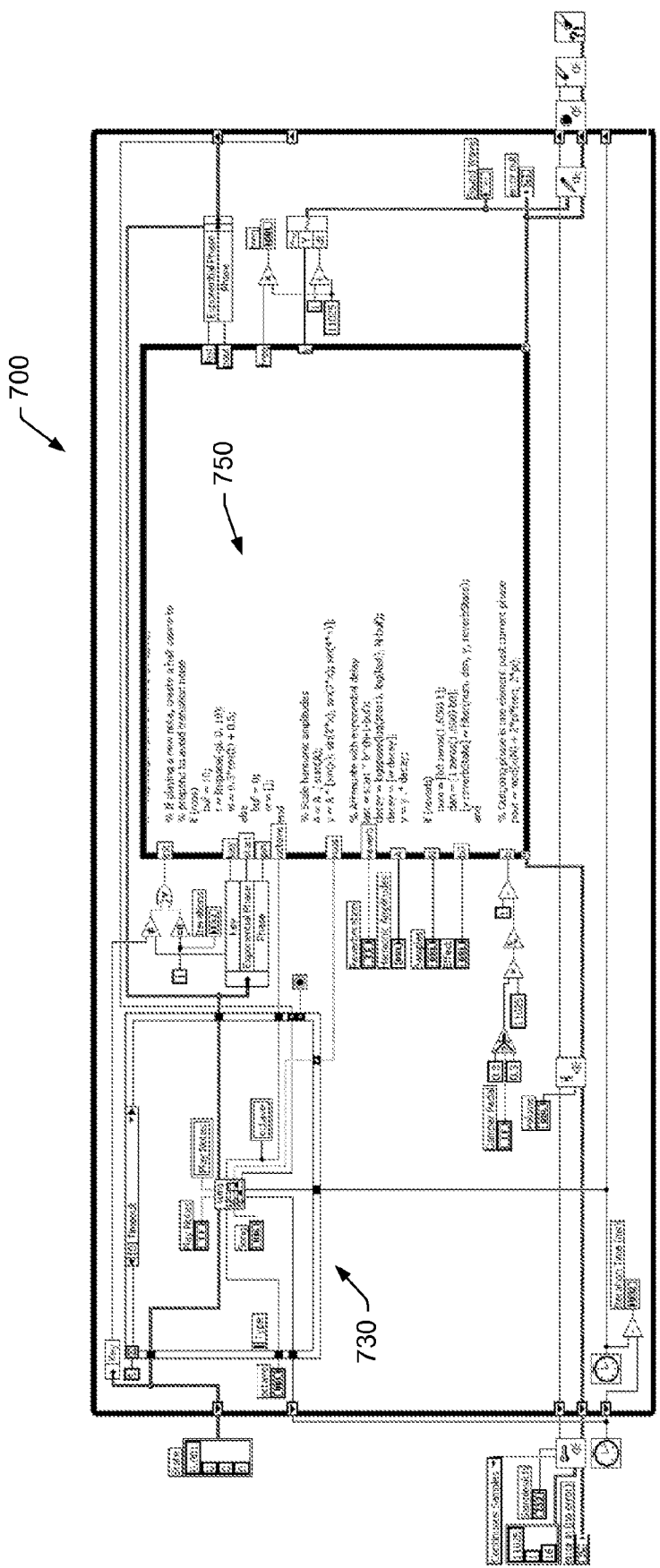
FIGS. 7 and 8 illustrate exemplary graphical programs with a plurality of computational models.
Figure 8:
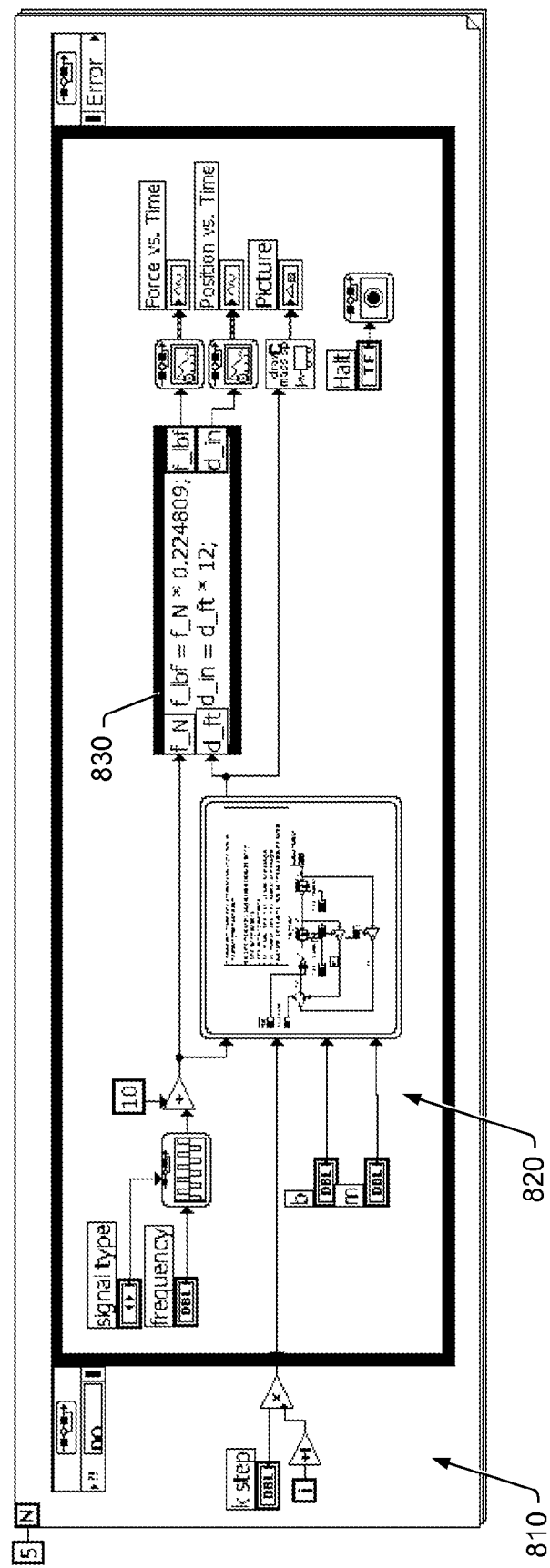

As one example, where the graphical program includes text-based code (or a node for inputting text, such as the exemplary graphical programs illustrated in FIGS. 7 and 8), the graphical program may actually include underlying graphical code for the text-based code. Thus, when the user changes the text-based code (one of the computational models in the graphical program), the graphical programming environment (and/or the GPG program) may modify the underlying graphical code automatically and in response to the user changes. Thus, the plurality of computational models may allow the user to easily modify and visually understand different portions of the graphical program without necessarily seeing the underlying graphical code. This may allow the user to view and edit the graphical program in a more user friendly or intuitive manner. Thus, the automatically generated graphical program may be specified in a plurality of computational models that are implemented using underlying graphical code, e.g., the LabVIEW graphical programming language (referred to as the "G" language) provided by National Instruments Corporation.

The GPG program may also automatically generate a user interface panel or front panel which may be used to provide input to and/or display output from the graphical program. In automatically generating a user interface panel, the method may automatically create various input controls and output indicators that correspond to inputs/outputs to/from the diagram, e.g., including controls and indicators that correspond to parameters of blocks in the automatically generated graphical program.

In one embodiment, the GPG program may be a self-contained program that includes all executable logic necessary for automatically generating the new graphical program. However, in the preferred embodiment, the GPG program utilizes a client/server programming model, in which the client portion processes the program information and determines the graphical program to be generated based on the program information (i.e., determines the function nodes or other objects to be included in the program, the interconnections among these nodes/objects, etc.). The client portion may then call an API provided by the server portion to request the server portion to perform the actual creation of the new graphical program, e.g., by creating files and/or other data structures representing the new graphical program. The server portion may execute on the same computer system as the client portion or may execute on a different computer system, e.g., a different computer system connected by a network. In one embodiment, the server portion may be an instance of a graphical programming development environment application, which provides an API enabling client programs to automatically create and/or edit graphical programs.

The method of FIG. 4 is illustrated and is described above in terms of generating a new graphical program. It is noted that a similar method may be used to modify an existing graphical program, e.g., in order to add functionality to the program, such as functionality specified by user input received by a user interface wizard. In other words, instead of specifying creation of a new graphical program, the GPG program may specify the modification of an existing graphical program. When executed, the GPG program is then operable to automatically modify the existing graphical program. For example, the GPG program may include a reference to the existing graphical program and may perform various API calls to modify the graphical program, e.g., by adding one or more objects to the graphical program, changing connections between graphical program objects, changing various properties of graphical program objects, etc.

It is noted that FIG. 4 represents one embodiment of a method for automatically generating a graphical program, and various steps may be added, reordered, combined, omitted, modified, etc. For example, as described above, the GPG program may include or may be associated with an application that the user uses to specify the program information. For example, such an application may enable the user to specify a state diagram, a test executive sequence, a prototype, etc., on which to base the graphical program. Thus, executing the GPG program in step 206 may comprise invoking a routine or program associated with this application, e.g., in response to the user selecting a menu option included in the application's user interface. In other embodiments, the user may launch the GPG program as an independent application.

In 212 the method may execute the generated graphical program (having the plurality of computational models). In one embodiment, the generated graphical program may be compiled for execution, where different compiler technologies may be used for the various program portions having different computational models. For example, in one embodiment, different compilers may be used for different computational models. For example, a graphical data flow compiler may be used for a data flow computational model portion and a text-based compiler may be used for a text-based portion of the graphical program (e.g., one represented in a text-based computational model). More specifically, in an automatically generated graphical program that includes C based textual code and a graphical data flow diagram, compilation of the graphical program may include compilation of the graphical data flow diagram to machine instructions using the LabVIEW® compiling engine and compilation of the C based textual code using a C compiler. Alternatively, some of the portions of the graphical program may be compiled and other portions may be interpreted. For example, the graphical program may include a state diagram computational portion that may be compiled and a MATLAB® script that is interpreted according to various embodiments. Thus, the execution of the graphical program may include interpretation of code and execution of compiled machine code. In alternate embodiments, all of the code may be interpreted upon execution.

In some embodiments, execution of the graphical program with a plurality of computational model may include determination of targets for portions of the graphical program. For example, in a computer system with a processor that includes a plurality of cores, compilation or execution of the graphical program may include selection of portions of the graphical program to various ones of the cores. As a more specific example, a graphical program that includes a data flow section computational model and a sequential computational model (e.g., a sequential text-based computational model), compilation and execution of the graphical program may include selection of various cores for each computational model. If the computer system includes four cores, the cores may be split among the computational models according to the respective complexity of the portions of the graphical program. Alternatively, or additionally, they may be split according to the ability of the computational model to support parallel processing. For example, the graphical data flow portion may more easily support multiple cores while the sequential text-based portion may more easily operate on a single core. Thus, in one embodiment, a plurality of cores may be assigned to the graphical data flow portion while only one or a few cores may be used by the text-based portion.

Assignment of the cores may be performed automatically, e.g., based on an analysis of the graphical program and its portions or in response to user input. For example, in one embodiment, the user may specify how many cores should be assigned to each portion of the graphical program. Alternatively, an analysis of the graphical may be performed for relative complexity of each of the portions or data dependencies of the portions (e.g., if there are several portions within a computational model that may execute relatively independently). Thus, selection of cores may be performed automatically (e.g., after an analysis of the graphical program or portions thereof) or manually specified by the user (or some combination thereof), among others.

Execution and/or compilation may include deploying the various portions (e.g., corresponding each of the plurality of computational models) or the entirety of the graphical program to one or more targets. The targets may include the cores of processors described above, or other targets. For example, the targets may include various programmable hardware elements such as FPGAs (Field Programmable Gate Arrays) or various measurement devices or computer systems (such as those described above, among others). Thus, compilation and execution of the graphical program may include deploying various portions of the graphical program to various targets. Note that the above examples are exemplary only and that other targets, determinations, computational models, compilation methods, and analyses are envisioned. For example, deploying the graphical program to various targets may be performed automatically, e.g., based on devices/targets compiled to the host computer and/or the abilities of the devices/targets.

In another embodiment, the compilation stage comprises converting the various program portions having the various different computational models into a single computational model, e.g., converting the various program portions into a graphical data flow computation model. For more information on this, please see U.S. Patent Publication No. 20050257195, incorporated by reference above. Various analyses of the single graphical data flow computation model may be performed to determine execution targets/assignment of cores for various portions in the newly generated/modified graphical data flow program, e.g., similar to the above descriptions.

Figure 5:
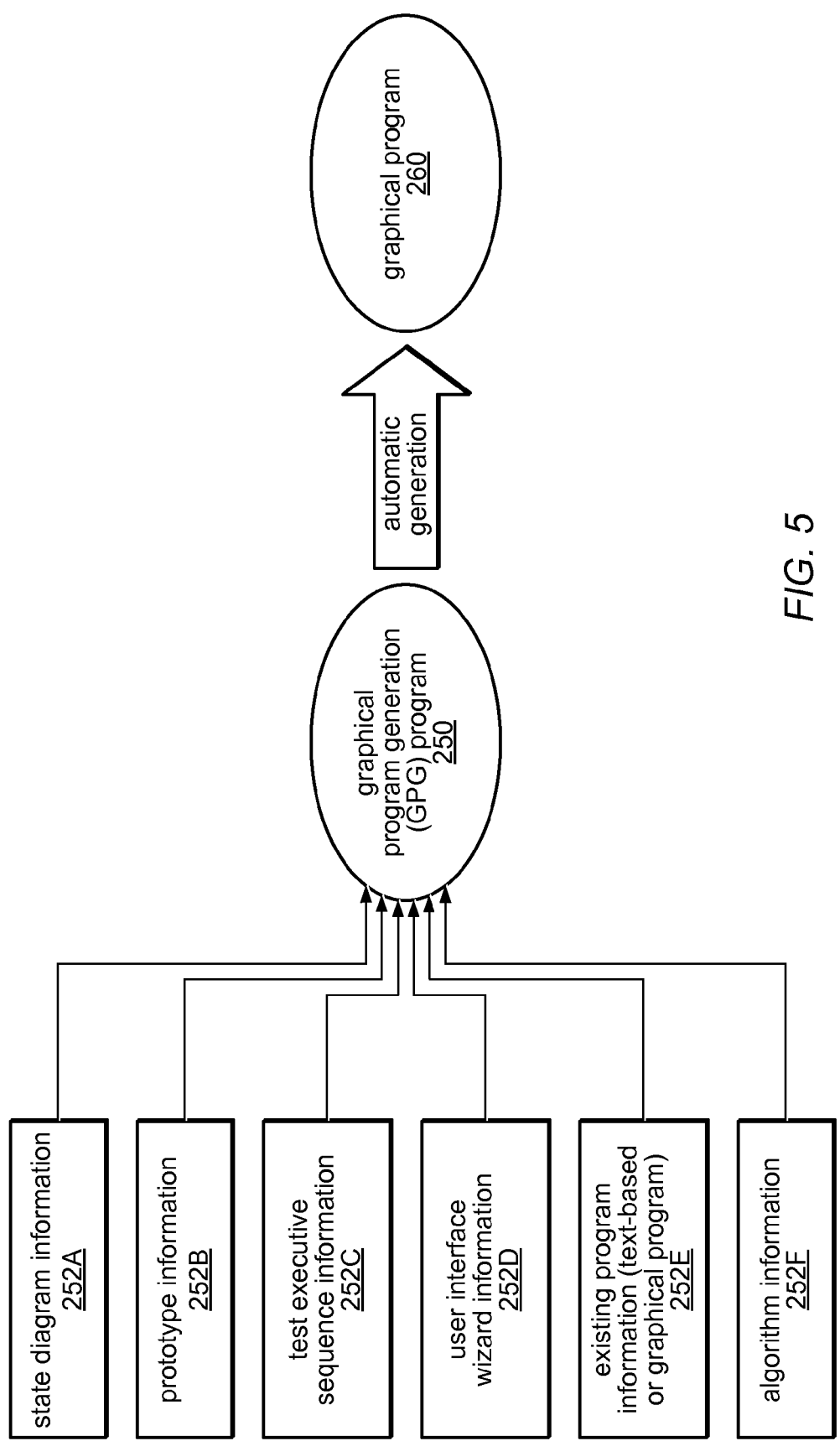
FIG. 5 is a block diagram illustrating that a "GPG program" which automatically generates a graphical program may be a program for any of various purposes and may receive information of any type to use in generating the graphical program.

FIG. 5—Examples of GPG Programs and Received Information

FIG. 5 is a block diagram illustrating that the GPG program may be a program for any of various purposes and may receive information of any type to use in generating a graphical program. FIG. 5 illustrates a GPG program 250 and various types of program information 252 that the GPG program may receive. One or more of the various program information 252 described herein may be used to specify the functionality of the graphical program. In other words, the program information may include many different portions or user inputs including one or more of those described below. Thus, according to various embodiments, the user may specify the functionality of the graphical program (and possibly the computational models thereof) using various ones of the methods described below (among others). In some embodiments, the program information input methods below may compose individual steps in a wizard that allows the user to specify the graphical program (or portions thereof).

In some embodiments, the GPG program 250 may include or be coupled with a program or application which a user utilizes to construct or characterize a computational process. In response to the specified computational process, the GPG program 250 may automatically generate a graphical program to implement the computational process.

For example, a state diagram editor may be used to construct a state diagram characterizing a computational process, e.g., in response to user input. As shown in FIG. 5, the GPG program 250 may then receive state diagram information 252A and use this state diagram information to automatically generate the graphical program. For example, the automatically generated graphical program may implement functionality specified by the state diagram created by the user. In some embodiments, the automatically generated graphical program may convert the state diagram to another computational model or may include the state diagram as a computational model in the automatically generated graphical program. Additionally, or alternatively, the state diagram editor may be one of a plurality of user inputs in specifying the functionality of the desired graphical program. Thus, in one embodiment, the state diagram editor may be used as a GUI or one step in a wizard in specifying the functionality of the graphical program.

As another example, the GPG program 250 may include or be coupled with a program or application which a user utilizes to construct a prototype, e.g., in order to characterize an algorithm at a high level. The constructed prototype may be represented as prototype information 252B. In this case, the GPG program 250 may then automatically generate a graphical program that implements the prototype, based on the prototype information 252B. Similar to above, the prototype editor may be one or more windows or GUIs in a wizard for specifying functionality of the graphical program. Additionally, or alternatively, the automatically generated graphical program may include a computational model similar to the prototype, or a computational model that includes functionality corresponding to the information entered by the user into the prototype editor. For more information on automatically generating a graphical program to implement a prototype, please see U.S. patent application Ser. No. 09/595,003, incorporated by reference above.

As another example, the GPG program 250 may include or be coupled with a program or GUI which a user utilizes to construct a test executive sequence, e.g., to perform a series of tests on a unit under test. In this case, the GPG program 250 may then automatically generate a graphical program operable to perform the series of tests when executed, based on test executive sequence information 252C. Similar to above, the test executive sequence program or GUI may be one or more windows or GUIs in the wizard for specifying functionality of the graphical program. Additionally, or alternatively, the automatically generated graphical program may include a computational model similar to the test executive sequence, or a computational model (e.g., execution flow) that includes functionality corresponding to the information entered by the user to specify the text executive sequence.

In other embodiments, the GPG program 250 may be associated with a program or application that directly aids the user in creating a graphical program. For example, the GPG program 250 may be associated with a graphical programming development environment application. In this case, the GPG program 250 may be operable to receive user input specifying desired functionality, indicated as user interface wizard information 252D in FIG. 5, and may automatically, i.e., automatically, add a portion of graphical source code to the user's graphical program implementing the specified functionality. For example, the user interface wizard information 252D may be received via one or more "wizard" graphical user interface (GUI) panels or dialogs enabling the user to specify various options. Such graphical program code generation wizards may greatly simplify the user's task of implementing various operations. As an example, it is often difficult for developers of instrumentation applications to properly implement code to analyze an acquired signal, due to the inherent complexity involved. By enabling the developer to specify the desired functionality through a high-level user interface, the developer can quickly and easily request appropriate graphical source code for implementing the signal analysis to be automatically included in the graphical program. Furthermore, since the graphical source code is generated automatically, the code may be optimized, resulting in an efficient program and a readable block diagram without unnecessary code. Additionally, various ones of the methods for entering the program instructions may be included as individual windows or portions of the wizard for specifying functionality of the graphical program.

In other embodiments, the GPG program 250 may be operable to automatically translate an existing program into a graphical program. The GPG program may examine the existing program and automatically generate a graphical program. In one embodiment, the GPG program may include or interface with different front-end plug-in modules, wherein each plug-in module is operable to analyze a particular type of program, e.g., a program written in a particular language or used by a particular development environment, and generate existing program information 252E usable by the GPG program for creating a graphical program that implements functionality of the existing program. The automatically generated graphical program may perform the same, or substantially the same functionally as, or a subset of the functionality of the existing program. Additionally, as indicated above, the automatically generated graphical program may include a plurality of computational models such as those described above, among others.

In one embodiment, the existing program may be a text-based program, such as a C program. In another embodiment, the existing program may itself be a graphical program. For example, although graphical programs created using different graphical programming development environments are similar in some respects, the graphical programs typically cannot be easily transferred across different graphical programming environments for editing or execution. For example, different graphical programming development environments provide different nodes for inclusion in a block diagram, store program files in different formats, etc. Thus, if an existing graphical program associated with one programming environment is desired to be ported to a new programming environment, the GPG program may examine the existing graphical program (or may examine abstract information specifying the existing graphical program) and may automatically generate a new graphical program associated with the new programming environment.

In another embodiment, the GPG program 250 may be operable to automatically generate a graphical program in response to algorithm information 252F.

In addition to the examples given above, a GPG program 250 may receive any other type of information and automatically generate a graphical program with a plurality of computational models based on the received information.

It is noted that, in various embodiments, the GPG program 250 may receive the information 252 used in generating the graphical program in any of various ways. The information may be received from the user, from another program, or from other sources, such as a file or database. The information may comprise information of any type, including text or binary information structured in any of various ways. The information may be self-describing, and/or the GPG program may include knowledge of how to interpret the information in order to generate the appropriate graphical program.

As an example, consider a state diagram editor application usable for constructing a state diagram. In this example, the GPG program may be or may be included in the state diagram editor application itself. For example, the state diagram editor application may receive user input specifying state diagram information. The state diagram editor application may then automatically generate a graphical program to implement functionality specified by the state diagram information, e.g., in response to the user selecting a menu option to generate the graphical program. In some cases, the automatically generated program including a plurality of computational models may include the specified state diagram (or one corresponding to the specified state diagram) as one of the computational models. In other embodiments, the GPG program may be separate from the state diagram editor application. For example, when the user selects the menu option to generate the graphical program, the state diagram editor application may provide the state diagram information to another application, i.e., the GPG program, which then generates the graphical program based on this information. In another embodiment, a user may invoke the GPG program separately and request the GPG program to generate a graphical program, e.g., by specifying a state diagram file. The GPG program may receive the state diagram information in any of various ways formats, e.g., as binary data, XML data, etc.

In most of the examples given above, functionality of the graphical program to be generated is specified explicitly by the received information. For example, a state diagram, user input specified via a wizard interface, a prototype, a test executive sequence, and an existing program, all explicitly specify, to varying degrees, functionality which the graphical program should implement.

It is noted that in other embodiments the received information by itself may not explicitly or inherently specify functionality of the graphical program to be generated. In a case such as this, the functionality of the generated graphical program may be determined mainly by the GPG program. Thus, one embodiment may include different "types" of GPG programs, wherein each type of GPG program is configured to generate graphical programs of a certain type. For example, consider two different GPG programs, program A and program B, which are both operable to receive numeric data from a database and create a graphical program based on the numeric data. Program A may be operable to create a graphical program which, when executed, performs one type of operation on the numeric data, and program B may be operable to create a graphical program which, when executed, performs a different type of operation on the numeric data. Thus, in these examples, the functionality of the graphical program is determined mainly by the GPG program that generates the graphical program.

Thus, in various embodiments, the functionality of the graphical program may be determined by the received program information, and/or the GPG program. In some cases the functionality may be specified almost entirely by the received information. For example, in a case where the GPG program automatically translates an existing program to a new graphical program, the functionality of the new graphical program may be specified entirely by the existing program. In other cases, the received information and the GPG program may each determine a portion of the functionality. For example, in a case where the GPG program generates a graphical program to implement a test executive sequence, the test executive sequence information may determine the body of the program which includes the code for executing the tests, but the GPG program may be operable to add additional functionality to the graphical program, e.g., by adding code operable to prompt the user for a log file and save test results to the log file, code to display a user interface indicating the current unit under test and the current test being performed, etc.

In a typical case, the implementation of the source code for the graphical program is determined mainly or entirely by the GPG program, although the received information may influence the manner in which the GPG program generates the code, or the GPG program may receive separate information influencing the code generation. For example, consider a GPG program operable to translate an existing graphical program to a new graphical program, e.g., in order to port the existing graphical program to a new programming environment. In one embodiment, the GPG program may be operable to generate the new graphical program in such a way as to match the existing graphical program as closely as possible in appearance. In other words, the new graphical program may be generated so that when the user sees the block diagram of the new graphical program, the block diagram appears substantially the same as the block diagram of the existing graphical program, e.g., in terms of the number of block diagram nodes, the layout and interconnections among the block diagram nodes, etc. However, it should be noted that the newly generated graphical program may include a plurality of computational models, so that in cases where the existing graphical program is specified in only one computational model (e.g., data flow), the newly generated graphical program may differ visually from the existing graphical program. In another embodiment, the GPG program may be operable to implement the source code for the new graphical program differently, e.g., by optimizing the code where possible (e.g., by using different computational model(s)). In this example, the functionality of the generated graphical program may be the same in either case, but the graphical program may be implemented in different ways.

The GPG program may also receive input specifying how to implement the graphical program. For example, in the case above, the user may specify whether or not to perform optimizations when translating an existing graphical program. For example, the new programming environment may support downloading the generated graphical program to a hardware device for execution. If the user desires to download the generated graphical program to a hardware device, e.g., for use in a real-time application, then it may be important to optimize the new program. Otherwise, it may be more important to implement the generated graphical program similarly as the existing graphical program is implemented. As another example, the user may be able to specify a subset of the computational models of the graphical program.

In one embodiment, the GPG program may provide extended support for specifying graphical program code implementation, beyond the ability to specify simple options. For example, the GPG program may support plug-ins specifying code generation information for various cases. Referring again to the program translation example above, each plug-in may specify how to generate code intended for execution on a particular hardware device. For example, if the generated program is to be run on an FPGA, the generation of the code may be optimized depending on the number of gates available on that particular FPGA.

In various embodiments, an association between a generated graphical program and the received program information used in generating the graphical program may be maintained. For example, after the graphical program has been automatically generated, this association may enable a user to recall the program information or return to an application from which the program information originates, e.g., in order to view or edit the program information. For example, consider a prototyping environment application which enables a user to develop a prototype characterizing an algorithm. The prototyping environment application may automatically generate a graphical program implementing the developed prototype. The user may then execute the graphical program, and if a problem with the program is discovered, the association may enable the user to return to the prototyping environment application in order to view or modify the prototype used to generate the program. The graphical program may then be automatically modified or re-generated accordingly.

In one embodiment, a generated graphical program may be "locked", requiring the user to explicitly unlock the program before the program can be modified within the graphical programming environment. Locking the graphical program may facilitate the retrieval or recreation of the program information that was used to generate the graphical program.

In various embodiments, the GPG program may be operable to generate any of various types of graphical programs. For example, as discussed above, a generated graphical program may be targeted toward a particular graphical programming development environment application, e.g., to utilize proprietary features or to create files that are formatted in a manner expected by the graphical programming development environment. Examples of graphical programming development environments include LabVIEW, BridgeVIEW, DasyLab, and DiaDem from National Instruments, VEE from Hewlett Packard, Simulink from The MathWorks, Softwire from Measurement Computing, Inc., Sanscript from Northwoods Software, WiT from Coreco, and Vision Program Manager from PPT Vision, among others.

In various embodiments, the graphical program may be generated using any of various methods or techniques. Generating the graphical program may comprise generating one or more files defining the graphical program. When a user interactively develops a graphical program from within a graphical programming environment, the graphical programming environment may create one or more program files. For example, the program files may specify information such as a set of nodes that the graphical program uses, interconnections among these nodes, automatic structures such as loops, etc. In other cases, the program files may store various data structures, e.g., in binary form, which the graphical programming environment uses to directly represent the graphical program. Thus, in automatically generating the graphical program, the GPG program may automatically generate one or more files representing the graphical program, wherein these files are structured or formatted appropriately for a particular graphical programming environment.

In various cases, a graphical program generated by a GPG program in response to program information may be a fully working program. Thus, the user may load the generated graphical program into the graphical programming environment, execute the program, etc. In other cases, the generated graphical program may not be a complete program. As an example, if an existing program is translated to a graphical program, it may not be possible to translate the entire program. For example, the existing program may utilize functions which do not exist in the graphical programming environment to which the program is to be ported. However, the GPG program may still create a partial graphical program, making it relatively easy for the user to complete the graphical program. In still other cases, it may be desirable to automatically generate only a graphical code portion, e.g., as discussed above in the case of user interface wizard tools that aid the user in program development.

Figure 6:
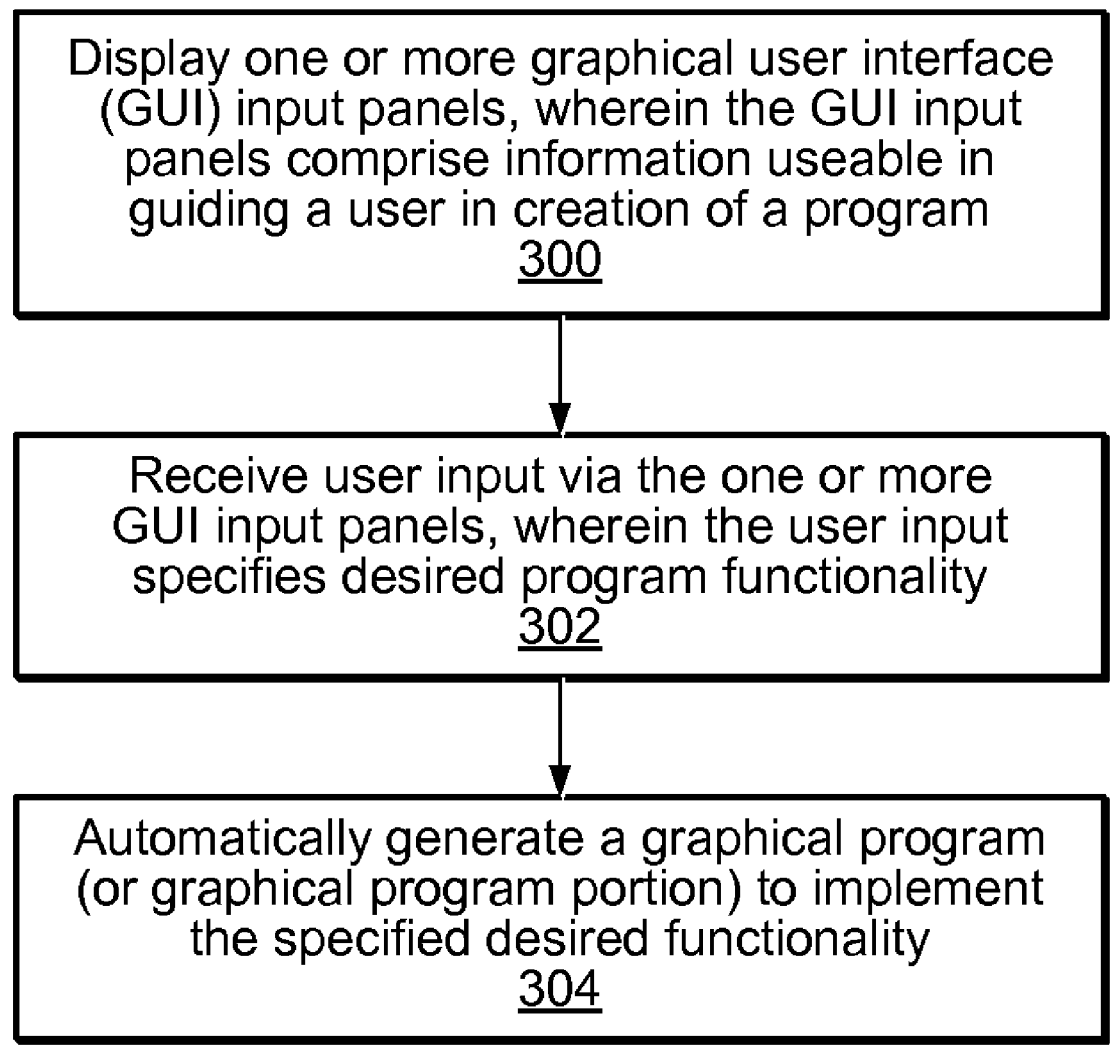
FIG. 6 is a flowchart diagram illustrating one embodiment of a method for automatically generating a graphical program in response to user input received via a graphical user interface.

FIG. 6—Automatically Generating a Graphical Program

As discussed above, in one embodiment, a graphical program, or portion of a graphical program, may be automatically generated in response to program information received as user input. As also discussed above, the graphical portion or the portion may include a plurality of computational models. FIG. 6 is a flowchart diagram illustrating one embodiment of a method for automatically generating a graphical program in response to user input received via a graphical user interface (GUI). The GUI may be any type of GUI, and the user input may be received via the GUI in any of various ways. In one embodiment, the GUI may comprise one or more GUI input panels. The GUI input panels may take any of various forms, including a dialog box or window, and may include any of various means for receiving user input, such as menus, GUI input controls such as text boxes, check boxes, list controls, etc. The GUI input panels may comprise textual and/or graphical information and may be able to receive textual and/or graphical user input. Note that the GUI may include or implement all of the functionality described above with respect to the GPG program.

In step 300, the GUI may be displayed, e.g., one or more graphical user interface (GUI) input panels may be displayed, wherein the GUI input panels comprise information useable in guiding a user in creation of a program. For example, the GUI may include various code generation "wizards", i.e., tools that enable a user to specify desired program functionality at a high level via GUI input panels. The GUI input panels may be displayed in response to user input indicating a desire to specify program functionality. For example, the GUI input panels may be invoked in response to user input to various menu options (e.g., of the GUI).

In step 302, user input specifying desired program functionality may be received via the one or more GUI input panels. For example, as described above, the GUI input panels may comprise various GUI input controls such as text boxes, check boxes, list controls, etc., and the user may configure these GUI input controls to indicate the desired program functionality. As an example, consider a case where the GUI input panels enable the user to specify program functionality for generating waveform data. In this example, the GUI input panel may include a list GUI control for choosing whether to generate the data as a sine wave, square wave, etc., a numeric GUI control for specifying the desired amplitude for the wave, a numeric GUI control for specifying the desired frequency for the wave, etc. Thus, in this example, the user input received may specify the desired waveform type, the desired amplitude and frequency, etc.

In step 304, a graphical program (or graphical program portion) to implement the specified desired functionality may be automatically generated in response to the received user input. As described above, automatic generation of the graphical program may include little or no user input. In particular, automatically generating the graphical program is performed without user input specifying the nodes or connections between the nodes. Thus the user is not required to select and place nodes in the diagram, or draw connections (lines or wires) between the nodes. As also indicated, the graphical program (or graphical program portion) may include a plurality of computational models. Additionally, the method may include automatically including graphical source code (e.g., the underlying graphical code described above) in the graphical program. For example, the automatically generated graphical source code may comprise a plurality of nodes that are interconnected in one or more of a data flow, control flow, and/or execution flow format, so as to implement the specified functionality. The nodes may have input/output terminals, terminal names, comments, or other aspects that are automatically generated. Additionally, the automatically generated graphical program (or portion) may include various other computational models, e.g., synchronous data flow, state diagram, text-based code, or simulation, among others. Thus, the GPG program may be operable to generate various graphical programs (or portions), depending on the received user input. For example, in the waveform generation example discussed above, the GPG program may include a "sine wave" node in the graphical program if the user specifies to generate sine wave data in 302 or may include a "square wave" node in the graphical program if the user specifies to generate square wave data.

It is noted that in 300 and 302, a plurality of GUI input panels may be displayed, and user input may be received from each of these panels. For example, a first panel may be displayed on the display, e.g., corresponding to a first computational model, and the first panel may include one or more first fields adapted to receive first user input specifying first functionality of the graphical program. User input specifying first functionality of the graphical program may be received via the first panel. A second panel may then be displayed for receiving second user input specifying second functionality of the graphical program, e.g., corresponding to a second computational model. In one embodiment, the second panel that is displayed may be based on the first user input. In other words, in one embodiment the GUI input panels may be displayed in a wizard-based manner that guides the user in specifying the desired functionality.

FIGS. 7 and 8—Graphical Programs with a Plurality of Computational Models

FIGS. 7 and 8 illustrate exemplary graphical programs with a plurality of computational models which may be automatically generated using the systems and methods described above (among others). As shown, the graphical program 700 includes a first computational model 730 (data flow) and a second computational model 750 (text-based code). The graphical program 700 implements an electronic keyboard with audio effects. There is also the option to turn the graphical program 700 into a player piano so that it plays a song automatically. The graphical program 700 (and more particularly, the first computational model 730) includes virtual instruments (VIs) to control the sound output. Additionally, the graphical program 700 includes an event structure which handles user interaction, e.g., clicking a key on the keyboard and/or the timing for automatically playing notes. The text-based node of the second computational model 750 performs the sound using linear combinations of sinusoidal harmonics. Additionally, the second computational model includes text code which models a reverberation effect as well as a sustaining effect. Thus, the graphical program 700 includes the first computational model 730 and the second computational model 750.

As also shown, the graphical program 800 includes a first computational model 810 (data flow), a second computational model 820 (continuous time simulation data flow), and a third computational model 830 (text-based code). More specifically, the for loop and nodes outside 820 represent data flow computation, the formula node 830 represents text-based computation, and the remaining portion (inside 820) represents continuous time simulation data flow. Thus, the graphical program 800 includes three computational models.

Thus, FIGS. 7 and 8 illustrate exemplary graphical programs with a plurality of computational models which may be created using the methods described above (among others).

Figure 9:
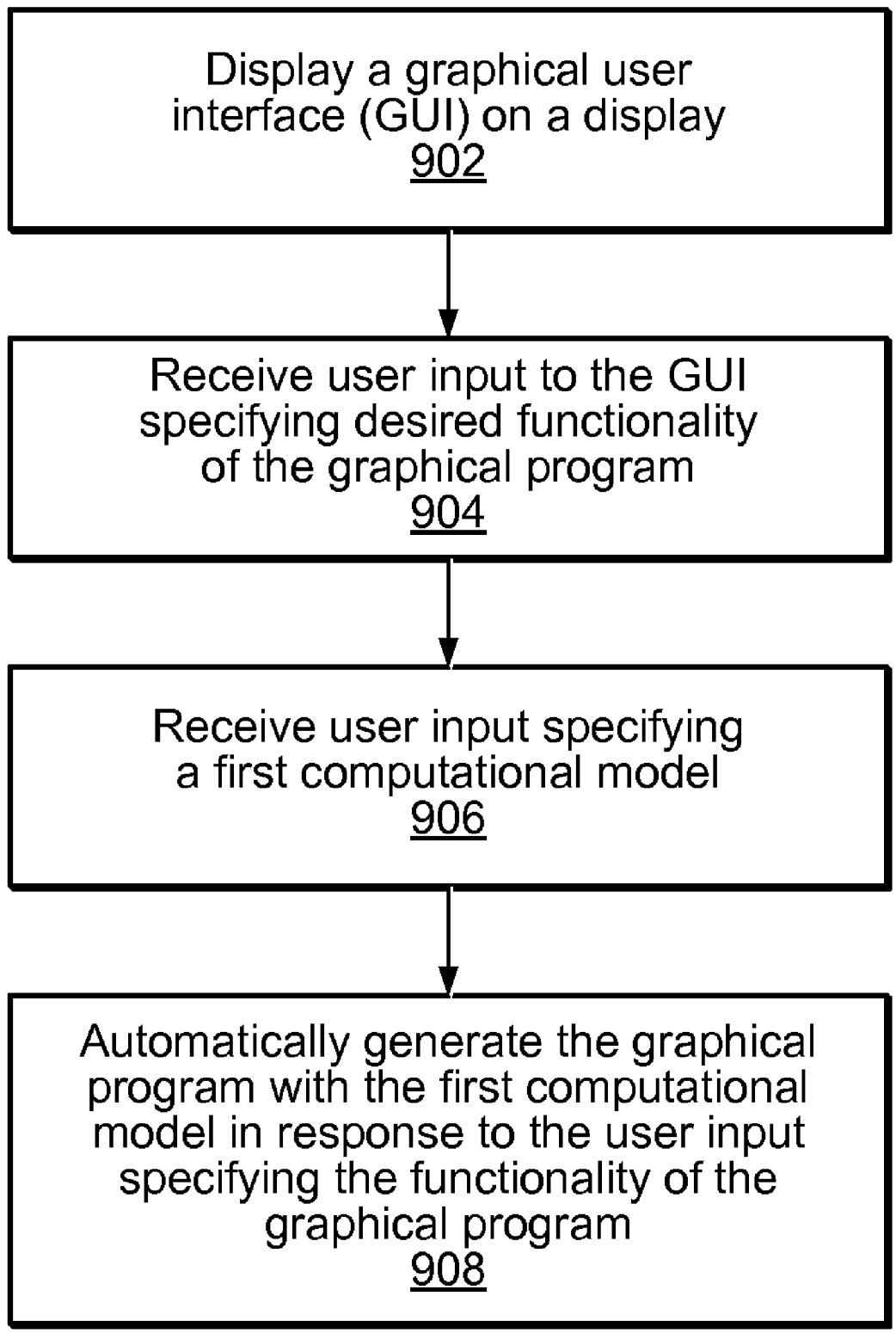
FIG. 9 is a flowchart diagram illustrating one embodiment of a method for automatically generating a graphical program with a specified computational model.

FIG. 9—Graphical Program with Specified Computational Model

FIG. 9 is a flowchart illustrating an exemplary method for automatically generating a graphical program with a specified computational model. The method of FIG. 9 may be used with any of the systems described herein. Additional steps may be added as desired. Various ones of the illustrated steps may be modified, performed in a different other than shown, or omitted entirely, as desired. As shown, the method operates as follows.

In 902, a graphical user interface (GUI) may be displayed on a display. The GUI may be one of a plurality of possibly GUIs such as those described above, among others. For example, the GUI may include a plurality of windows that each correspond to steps along the process in specifying desired functionality of the graphical program. Additionally, or alternatively, the GUI may be or be included in the GPG program described above. In some embodiments, the GUI may include different windows associated with different possible computational models. Thus, the GUI may be any of a variety of GUIs (such as those described above, among others) and may be used for specifying desired functionality of the graphical program.

In 904, user input may be received to the GUI specifying desired functionality of the graphical program. Similar to descriptions above, the user input may vary from graphical program to graphical program. In other words, the user may specify the functionality of the graphical program via a variety of methods (such as those described above, among others). For example, the user input may directly specify functionality of the graphical program, e.g., by entering information or interactively creating various diagrams or configurations. Alternatively, or additionally, the user input may specify various template programs or already created programs to be used to generate the graphical program.

In 906, user input specifying a first computational model may be received. As described above, the computational model may be selected from a plurality of computational models, e.g., graphical data flow, synchronous data flow, execution flow, state diagram, control flow diagram, text-based code, and/or simulation diagram, among others. In some embodiments, the user input specifying the first computational model may be received to the GUI as a part of 804. In other words, the user input specifying the desired functionality of the graphical program may also specify the first computational model. For example, if the user specifies functionality of the graphical program by creating, for example, a state diagram, the GUI (e.g., the GPG program) may not ask the user to specify the computational model, but instead may determine that the computational model is a state diagram. Alternatively, the GUI may suggest a computational model to the user based on the user input, and the user may have the option to accept the suggested computational model or specify a new computational model as desired. In one embodiment, the GUI may analyze the user input specifying the desired functionality and determine an appropriate computational model. Where the user's specification and the determined computational model differ, the GUI may indicate the determined computational model to the user. The user may then have the opportunity to accept the suggested computational model or specify a different computational model.

In 908, the graphical program may be automatically generated with the first computational model in response to the user input specifying the functionality of the graphical program. Similar to descriptions above, the graphical program may be automatically generated via a variety of methods such as those described above, among others. As also described above, the graphical program may be implemented via underlying graphical code. Thus, in one embodiment, the graphical program may be specified in the specified computational and be implemented in an underlying graphical code, e.g., G from National Instruments Corporation.

Implementation of Automatic Generation

The above-discussed examples of automatically generating a graphical program or graphical program portion may be implemented in any of various ways. For more information on one embodiment of a system and method for automatically generating a graphical program, please refer to the above-incorporated patent applications. In particular, refer to the above-incorporated patent application titled, "System and Method for Programmatically Generating a Graphical Program in Response to Program Information".

Benefits of the Method

Using the methods described above, various graphical programs may be automatically generated including two or more computational models. Automatic generation of these graphical programs may allow the user to more easily and intuitively view and understand the functionality of the graphical program. For example, where the graphical program implements an algorithm using, for example, a series of ordinary differential equations, the graphical program may include a first portion having a plurality of interconnected nodes, and a second portion comprising a text-based script. Thus, it may be more intuitive for the user to view and modify the algorithm in a text-based sequential computational model such as in a MathScript™ script. As another example, the automatically generated graphical program may have a first portion having a plurality of interconnected nodes and a second portion comprising a state diagram representation. In this instance, it may make more sense for the user to modify a state diagram when editing a machine vision process rather than trying to analyze or modify a normal graphical data flow diagram.

Additionally, where the user, computer, or GUI for automatically generating the graphical program includes or is aware of already existing diagrams, algorithms, program instruction files, etc., the current method may be particularly advantageous as this legacy code can be reused, e.g., to efficiently generate new sophisticated programs. Thus, various information or diagrams that have already been programmed or specified in different computational models may be used or included in a single graphical program. In this manner, the graphical program can utilize the advantages of each of the different computational models and/or reuse legacy code to implement new or additional functionality.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A non-transient computer-accessible memory medium comprising program instructions for automatically generating a graphical program, wherein the program instructions are executable to:
    display a graphical user interface (GUI) on a display;
    receive user input to the GUI specifying desired functionality of the graphical program, wherein the user input to the GUI comprises first user input specifying first desired functionality of a first portion of the graphical program and second user input specifying second desired functionality of a second portion of the graphical program;
    automatically generate the graphical program in response to the user input specifying the functionality of the graphical program, wherein the graphical program implements the specified functionality, and wherein the graphical program comprises the first portion having a first computational model and the second portion having a second computation model, wherein the first specified functionality corresponds to the first computational model and the second specified functionality corresponds to the second computational model, wherein the first computational model and the second computational model are different types of computational models;
    display the graphical program on the display, wherein in displaying the graphical program, the program instructions are executable to display the first portion of the graphical program specified in the first computational model and display the second portion of the graphical program specified in the second computational model.

2. The memory medium of claim 1, wherein the first portion of the graphical program having the first computational model comprises a plurality of interconnected nodes that visually indicate functionality of the first portion of the graphical program.

3. The memory medium of claim 1, wherein the first computational model and the second computational model each comprise one or more of:
    graphical data flow;
    synchronous data flow;
    execution flow;
    state diagram;
    control flow diagram; or
    simulation diagram.

4. The memory medium of claim 1, wherein in receiving user input to the GUI specifying the desired functionality of the graphical program, the program instructions are executable to:
    receive a plurality of user inputs, wherein each user input specifies desired functionality of a respective portion of the graphical program, wherein each specified functionality corresponds to a respective computational model.

5. The memory medium of claim 1, wherein in automatically generating the graphical program, the program instructions are executable to:
    automatically generate the graphical program in an underlying graphical code, wherein the graphical program visually indicates the first and second computational models.

6. The memory medium of claim 1, wherein the user input specifies the first computational model for the first portion of the graphical program, and wherein the user input specifies the second computational model for the second portion of the graphical program.

7. The memory medium of claim 1, wherein, in automatically generating the graphical program, the program instructions are executable to automatically determine the first computational model for the first portion of the graphical program and automatically determine the second computational model for the second portion of the graphical program.

8. The memory medium of claim 1, wherein, in displaying the GUI, the program instructions are executable to display a first GUI corresponding to the first computational model and display a second GUI corresponding to the second computational model.

9. The memory medium of claim 1, wherein the GUI comprises a plurality of windows that compose a wizard, and wherein receiving user input to the GUI comprises receiving user input to the plurality of windows of the wizard.

10. The memory medium of claim 1, wherein the graphical program on the display is comprised within a single window.

11. A method for automatically generating a graphical program, the method comprising:
    displaying a graphical user interface (GUI) on a display;
    receiving user input to the GUI specifying desired functionality of the graphical program, wherein the user input to the GUI comprises first user input specifying first desired functionality of a first portion of the graphical program and second user input specifying second desired functionality of a second portion of the graphical program;
    automatically generating the graphical program in response to the user input specifying the functionality of the graphical program, wherein the graphical program implements the specified functionality, and wherein the graphical program comprises the first portion having a first computational model and the second portion having a second computation model, wherein the first specified functionality corresponds to the first computational model and the second specified functionality corresponds to the second computational model, wherein the first computational model and the second computational model are different types of computational models.

12. The method of claim 11, wherein the plurality of computational models comprise one or more of:
    graphical data flow;
    synchronous data flow;
    execution flow;
    state diagram;
    control flow diagram;
    text-based code; or
    simulation diagram.

13. The method of claim 11, wherein said receiving user input to the GUI specifying the desired functionality of the graphical program further comprises:
    receiving a plurality of user inputs, wherein each user input specifies desired functionality of a respective portion of the graphical program, wherein each specified functionality corresponds to a respective computational model.

14. The method of claim 11, wherein said automatically generating the graphical program comprises:
   automatically generating the graphical program in an underlying graphical code, wherein the graphical program visually indicates the plurality of computational models.

15. The method of claim 11, wherein the user input specifies one or more computational models, and wherein the automatically generated graphical program is specified in the one or more computational models.

16. The method of claim 11, wherein the user input specifies a first computational model for a first portion of the graphical program, and wherein the user input specifies a second computational model for a second portion of the graphical program.

17. The method of claim 11, wherein said automatically generating the graphical program comprises automatically determining a first computational model for a first portion of the graphical program and automatically determining a second computational model for a second portion of the graphical program.

18. The memory medium of claim 11, wherein said displaying the GUI comprises displaying a first GUI corresponding to a first computational model and displaying a second GUI corresponding to a second computational model.

19. The method of claim 11, further comprising:
   determining a subset of computational models of a plurality of computational models for implementing the desired functionality; and
   wherein the automatically generated graphical program is specified in the subset of computational models.

20. The method of claim 11, wherein the GUI comprises a plurality of windows that compose a wizard, and wherein said receiving user input to the GUI comprises receiving user input to the plurality of windows of the wizard.

21. The method of claim 11, further comprising:
   displaying the graphical program on a display, wherein the graphical program is comprised within a single window on the display.

22. A computer system for automatically generating a graphical program, the computer system comprising:
   a processor;
   a non-transient memory medium coupled to the processor, wherein the memory medium comprises program instructions executable by the processor to:
   display a graphical user interface (GUI) on a display;
   receive user input to the GUI specifying desired functionality of the graphical program, wherein the user input to the GUI comprises first user input specifying first desired functionality of a first portion of the graphical program and second user input specifying second desired functionality of a second portion of the graphical program; and
   automatically generate the graphical program in response to the user input specifying the functionality of the graphical program, wherein the graphical program implements the specified functionality, and wherein the graphical program comprises the first portion having a first computational model and the second portion having a second computation model, wherein the first specified functionality corresponds to the first computational model and the second specified functionality corresponds to the second computational model, wherein the first computational model and the second computational model are different types of computational models.

23. A non-transitory computer-accessible memory medium comprising program instructions for automatically generating a graphical program, wherein the program instructions are executable to:
   display a graphical user interface (GUI) on a display;
   receive user input to the GUI specifying desired functionality of the graphical program;
   analyze the user input to the GUI specifying desired functionality of the graphical program;
   indicate a suggested computational model of a plurality of possible computational models to the user based on the analysis;
   receive user input specifying a first computational model of the plurality of possible computational models;
   automatically generate the graphical program in response to the user input specifying the functionality of the graphical program, wherein the graphical program implements the specified functionality, and wherein the graphical program is specified in the first computational model.

24. The memory medium of claim 23, wherein the plurality of possible computational models comprise:
   graphical data flow;
   synchronous data flow;
   execution flow;
   state diagram;
   control flow diagram; or
   simulation diagram.

* * * * *

UNITED STATES PATENT AND TRADEMARK OFFICE
CERTIFICATE OF CORRECTION

| | |
|---|---|
| PATENT NO. | : 8,271,943 B2 |
| APPLICATION NO. | : 11/739373 |
| DATED | : September 18, 2012 |
| INVENTOR(S) | : Duncan G. Hudson, III |

It is certified that error appears in the above-identified patent and that said Letters Patent is hereby corrected as shown below:

In the Claims:

Column 33, Claim 1, Line 16, please delete "non-transient" and substitute -- non-transitory --.

Column 35, Claim 22, Line 43, please delete "non-transient" and substitute -- non-transitory --.

Signed and Sealed this
Eighteenth Day of December, 2012

David J. Kappos
*Director of the United States Patent and Trademark Office*